United States Patent [19]

Jin et al.

[11] Patent Number: 5,494,879
[45] Date of Patent: Feb. 27, 1996

[54] CATALYST FOR THE REDUCTION OF SULFUR DIOXIDE TO ELEMENTAL SULFUR

[75] Inventors: Yun Jin; Qiquan Yu, both of Peking, China; Shih-Ger Chang, El Cerrito, Calif.

[73] Assignee: Regents, University of California, Berkeley, Calif.

[21] Appl. No.: 23,765

[22] Filed: Feb. 26, 1993

[51] Int. Cl.$^6$ .......................... B01J 23/745; B01J 23/80; B01J 23/881; B01J 23/887
[52] U.S. Cl. .......................... 502/314; 502/306; 502/307; 502/315; 502/316; 502/313; 502/241; 502/245; 502/253; 502/255; 502/257; 502/258; 502/259; 502/260; 502/66; 502/324; 502/329; 502/331; 502/335; 502/336; 502/215; 423/244.02; 423/570
[58] Field of Search .................... 502/306, 307, 502/315, 316, 313, 323, 525, 241, 244, 245, 252, 253, 255, 257, 258, 259, 260, 66, 318, 319, 320, 321, 322, 324, 328, 329, 314, 331, 332, 335, 336, 215; 423/244.02, 570

[56] References Cited

U.S. PATENT DOCUMENTS

| | | | |
|---|---|---|---|
| 3,764,665 | 10/1973 | Groenendaal et al. | 423/244 X |
| 3,985,861 | 10/1976 | Hudson | 423/570 X |
| 4,029,752 | 6/1977 | Cahn | 423/570 X |
| 4,036,943 | 7/1977 | Huron et al. | 423/570 X |
| 4,187,282 | 2/1980 | Matsuda et al. | 423/570 X |
| 4,818,740 | 4/1989 | Berben et al. | 502/313 |
| 5,034,369 | 7/1991 | Hebrard et al. | 423/570 X |
| 5,185,140 | 2/1993 | Kvasnikoff et al. | 423/574 R |
| 5,244,641 | 9/1993 | Khare | 423/244.06 |

FOREIGN PATENT DOCUMENTS

| | | | |
|---|---|---|---|
| 3529665 | 2/1987 | Germany. | |
| 58-015010 | 1/1983 | Japan. | |
| 0825133 | 5/1981 | U.S.S.R. | 423/244.02 |
| 1357056 | 12/1987 | U.S.S.R. | 423/244.02 |

OTHER PUBLICATIONS

Akhmedov et al *Zh. Prikl. Khim.* vol. 8, p. 1891, 1988.
Akhmedov et al *Zh. Prikl. Khim.* vol. 1, p. 16, 1988.
Akhmedov et al *Azerb. Khim. Zhi.* vol. 2, p. 95, 1983.
Akhmedov et al *Khim. Prous.* vol. 1, p. 37, 1989.

*Primary Examiner*—Douglas J. McGinty
*Attorney, Agent, or Firm*—Paul R. Martin; Kathleen Dal Bon

[57] ABSTRACT

The inventive catalysts allow for the reduction of sulfur dioxide to elemental sulfur in smokestack scrubber environments. The catalysts have a very high sulfur yield of over 90% and space velocity of 10,000 h$^{-1}$. They also have the capacity to convert waste gases generated during the initial conversion into elemental sulfur. The catalysts have inexpensive components, and are inexpensive to produce. The net impact of the invention is to make this technology practically available to industrial applications.

18 Claims, 11 Drawing Sheets

CATALYST FOR THE REDUCTION OF SULFUR DIOXIDE TO ELEMENTAL SULFUR

This invention was made with Government support under Contract No. DE-AC03-76SF00098 between the U.S. Department of Energy and the University of California for the operation of Lawrence Berkeley Laboratory. The Government has certain rights in this invention.

BACKGROUND OF THE INVENTION

This invention relates to catalysts and catalytic processing of sulfur dioxide to elemental sulfur.

A chronic concern for the environment has been release of pollution from industrial and other sources into the air and water. In order to avoid some of the local effects of air-born containments from manufacturing processes, these materials were released from the top of lengthy smokestacks. However, such smokestack industry emissions still added to the general environment contamination.

Of particular concern to environmentalists are gaseous emissions containing sulfur dioxide. When this gas rises to cloud level, the rain produced from these clouds can become highly acidic, reaching the acidic levels of vinegar. Because the emissions and clouds effected by them can travel great distances beyond the point of the initial emission, this form of pollution takes on international dimensions.

The effects of such industrially related acid rains are infamous. Streams and lakes in North West America and Canada have been rendered devoid of their natural flora and fauna due to acidification by acid rain. Trees in these areas have also been badly compromised. Similar effects have been seen in Europe, where large sections of trees in the famous Black Forest have been damaged, and in some cases, destroyed by the effects of acid rain.

In order to minimize the release of sulfur dioxide into the atmosphere, smokestack "scrubbers" have been developed. These are devices which to some degree remove sulfur dioxide from flue gases emitted by such facilities as power plants. Most of the presently available processes capture sulfur dioxide, and then convert this gas to a waste material. Examples of such waste materials are calcium sulfite and calcium sulfate.

The disadvantage of producing secondary waste materials from sulfur dioxide is that they, in turn, require disposal, and are ultimately released into the environment. Large amounts of sulfur dioxide are produced by activities requiring continuing combustion processes, such as power plants. As a result, the solid wastes produced by standard sulfur dioxide conversion methods represent an environmental problem in their own right.

In response to this problem with current $SO_2$ capture methods, researchers are attempting to develop regenerable flue gas desulfurization means and process. Some of these attempts to limit or avoid the production of contaminating solids have been commercialized, while others have not progressed beyond basic research.

In regenerable processing of sulfur dioxide, this gas must first be captured in some form. In the Welman-Lord, Tung, Cansolv, and Dow processes, sulfur dioxide from flue gas is first absorbed into an alkaline solution. In the NOXSO and CuO processes, the sulfur dioxide is adsorbed on a solid substrate and subsequently desorbed to produce a stream of high concentration sulfur dioxide.

In would be highly desirable to convert sulfur dioxide recovered from smokestack scrubbers to elemental sulfur. If this conversion could be accomplished in a commercially feasible fashion, it would facilitate storage and transportation of the waste products. It would also allow reclamation of sulfur and its recycling as a valuable chemical.

Preliminary research efforts have been made to allow the conversion of concentrated sulfur dioxide to elemental sulfur. In these methods, sulfur dioxide is reduced with synthesis gas. These gases are derived from coal ($H_2$/CO=0.3–1.0) or methane ($H_2$/CO=3). At elevated temperatures, sulfur dioxide can be converted to elemental sulfur according the following reaction:

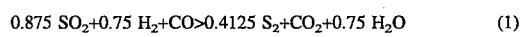

$$0.875\ SO_2 + 0.75\ H_2 + CO > 0.4125\ S_2 + CO_2 + 0.75\ H_2O \quad (1)$$

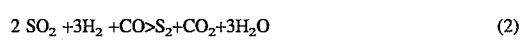

$$2\ SO_2 + 3H_2 + CO > S_2 + CO_2 + 3H_2O \quad (2)$$

Sulfur dioxide can also be reduced with natural gas (mainly methane)

$$2\ SO_2 + CHO_4 > S_2 + CO_2 2\ H_2O \quad (3)$$

These reactions must be facilitated with catalysts in order to achieve a real time high conversion efficiency of $SO_2$. Even with the assistance of numerous catalysts, commercially feasible conversion efficiencies have not been achieved.

In addition to elemental sulfur, the above reactions produces a number of undesirable byproducts. These can include hydrogen sulfide, carbonyl sulfide, carbon disulfide, and elemental carbon. These byproducts complicate the ability of the conversion reactions to effectively reduce the net airborne contaminants produced during industrial processing.

Because of the inadequacies of the above reactions when directed to actual industrial applications, research efforts have been carried out to bring this potentially useful area of technology to a level where it has practical applications. The thrust of these research efforts have been to improve the conversion efficiency of sulfur dioxide and increase the selectivity to the production of elemental sulfur at relatively low temperatures.

While there has been some success in this area of research, the results which have been reported to date can not practically be applied to commercial uses. Akhmedov, et al developed catalysts to facilitate the above reactions. These researchers were able to achieve a number of promising sulfur yields using a variety of catalysts. Using a bauxite-bentonite catalyst, a 64–65% sulfur yield was obtained at 350° C. with a feed gas at a molar ratio (CO+ $H_2$)/$SO_2$ of 2 and a space velocity of 1000 $h^{-1}$ (Akhmedov et. al., *Azerb. Khim. Zhi.*, Vol. 2, p. 95, 1983). A NiO/$Al_2O_3$ catalyst produced a 82.0% sulfur yield at 300° C. with a space velocity of 5000 $h^{-1}$. (Akhmedov et. al. *Zh. Prikl. Khim.*, Vol. 1, p. 16, 1988.) Some of this group achieved a 82.0% and 87.4% sulfur yield with a $Co_2O_3$/$Al_2O_3$ catalyst at 300° C. with a space velocity of 1000 $h^{-1}$; and 500 $h^{-1}$ respectively. (Akhmedov et. al, *Zh. Prikl. Khim.*, Vol. 8, p. 1891, 1988.) They also found a 82.3% and 78.6% sulfur yield with a NiO+$Co_3O_4$ catalyst at 400° C. with a space velocity of 500 $h^{-1}$ and 1000 $h^{-1}$ respectively. (Akhmedov et. al., *Khim. Prom.*, Vol. 1, p. 37, 1989.)

While the prior research provides tantalizing possibilities for the practical conversion of sulfur dioxide to elemental sulfur, there are a number of severe limitations to the technology as it is presently developed.

For instance, a 90% or better yield of elemental sulfur is important for the practical application of this technology to smokestack industries. As can be seen from the above discussion of the prior art, even pushing other aspects of the processing parameters to the limit, researchers have not been able to achieve yields at a 90% or higher level.

High space velocity is another important factor in making this technology practically available for industrial use. Space velocity is the factor describing the amount of catalyst required to process a given amount of sulfur dioxide within a proscribed time. Prior research efforts have required a very large reactor as compared with the rate of conversion. The space velocity factor alone can keep this technology from having practical applications. For instance, the limitations of the technology as presently developed are not sufficiently cost effective to be applied to standard power plant operation.

For methods for sulfur dioxide conversion to elemental sulfur to be practically applied to smokestack industries, it would be necessary to develop catalysts and methods which have high space velocities and conversion rates which could be achieved at relatively low temperatures.

BRIEF SUMMARY OF THE INVENTION

The present invention represents a dramatic advance in the catalytic conversion of sulfur dioxide to elemental sulfur. The unique catalytic formulations of the present invention, as well as the unexpected, critical processing parameters of the inventive method, will allow the practical application of this technology to industrial pollution problems. Additionally, the inventive method allows waste gases produced during the catalytic conversion to be reprocessed, achieving further diminution of net gaseous contaminants.

Therefore, it is an object of the present invention to provide catalyst formulations and catalyst processes which will allow the practical conversion of sulfur dioxide emissions to elemental sulfur using waste, synthesis or methane gases.

It is another object of the present invention to provide catalysts and catalytic methods which will convert sulfur dioxide to elemental sulfur with a high space velocity.

It is yet another object of the present invention to provide a catalyst formulation and method of sulfur dioxide conversion which allows the long term conversion process to be accomplished at relatively low temperatures.

It is still a further object of the present invention to provide catalysts and methods that will allow conversion of sulfur dioxide to elemental sulfur at an efficiency higher that 90%.

It is yet another object to allow recycling of conversion by products into the catalytic reactor.

DETAILED DESCRIPTION OF THE INVENTION

Figure 1:
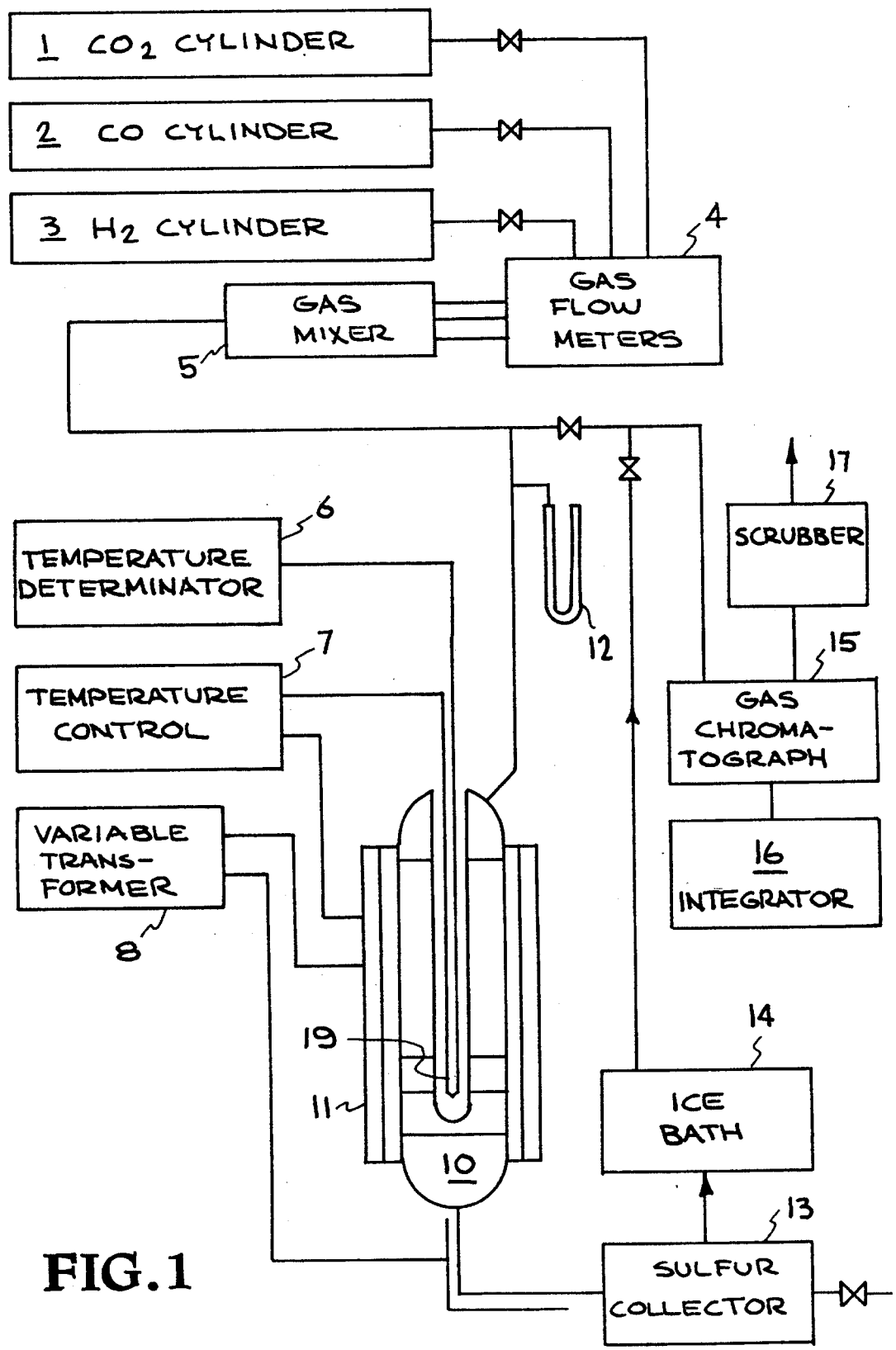
FIG. 1. is a schematic flow diagram of the experimental set-up described in the Example section of this application.
Figure 2:
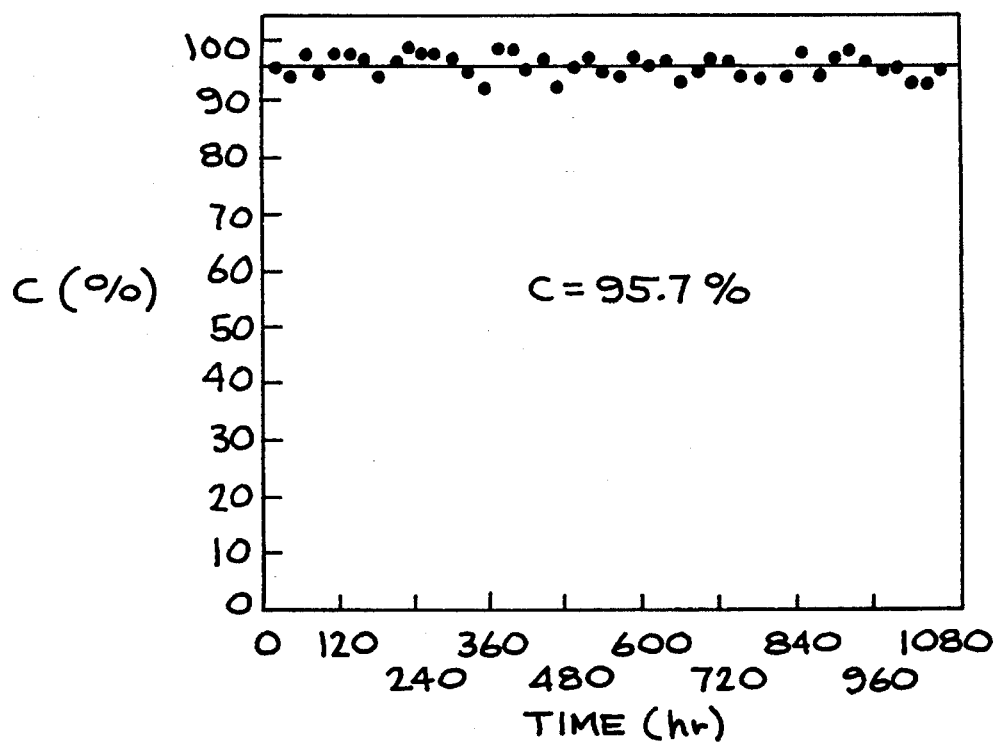
FIG. 2. shows the conversion of $SO_2$ as a function of reaction time for the Cat-S at feed gas molar ratios: $(H_2/CO)=0.75$, and $[(H_2+CO)/SO_2]=2$; S.V.=10,000 $h^{-1}$ ($F_{H2}=$ 2286 ml/h, $F_{CO}=3047$ ml/h, and $F_{SO2}=2667$ ml/h; and 1 g of Cat-S); and 440° C.
Figure 3:
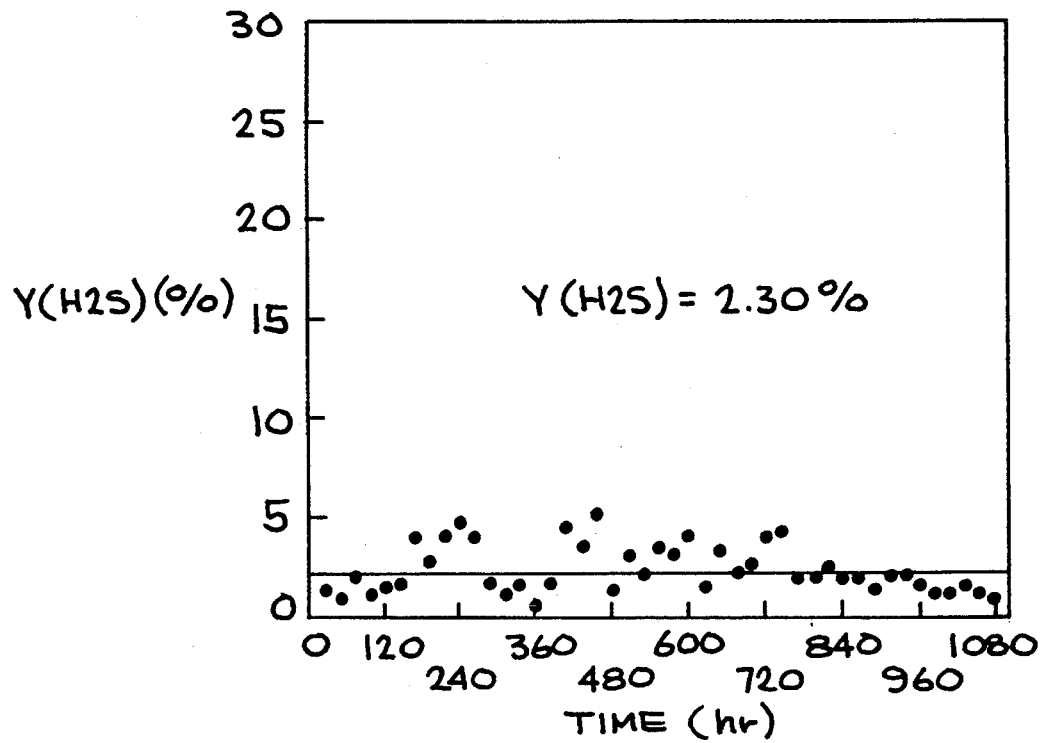
FIG. 3. shows the yield of $H_2S$ as a function of reaction time for the Cat-S at feed gas molar ratios: $(H_2/CO)=0.75$, and $[(H_2+CO)/SO_2]=2$; S.V.=10,000 $h^{-1}$ ($F_{H2}=2286$ ml/h, $F_{CO}=3047$ ml/h, and $F_{SO2}=2667$ ml/h; and 1 g of Cat-S); and 440° C.
Figure 4:
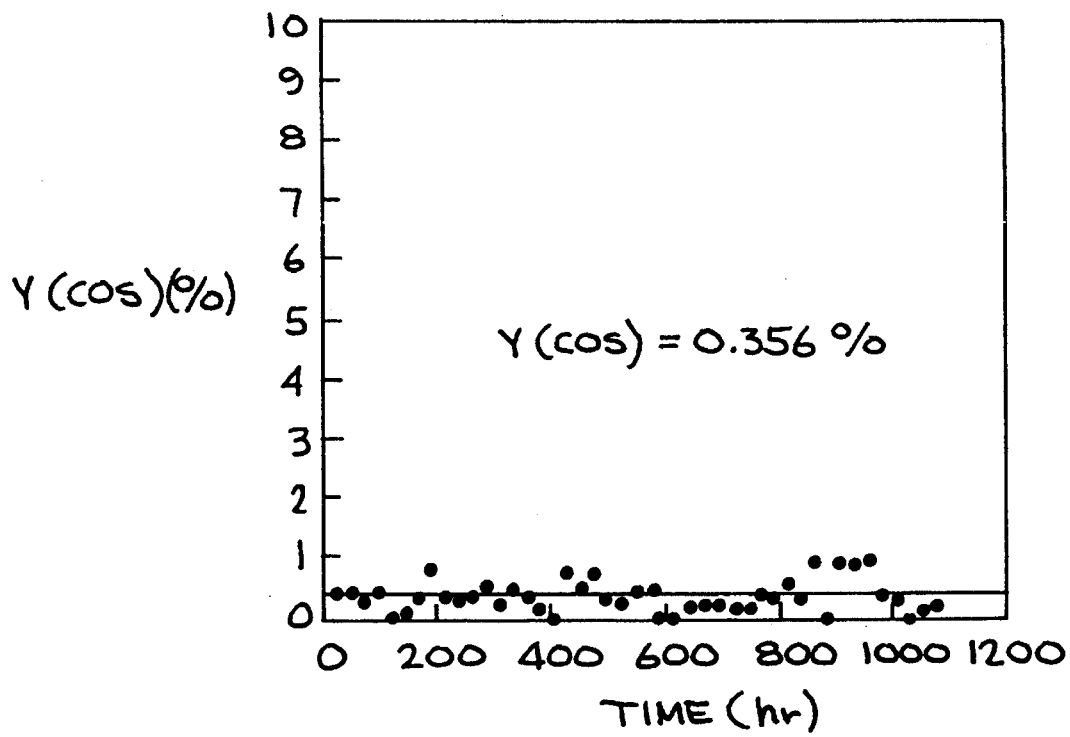
FIG. 4. shows the yield of COS as a function of reaction time for the Cat-S at feed gas molar ratios: $(H_2/CO)=0.75$, and $[(H_2+CO)/SO_2]=2$; S.V.=10,000 $h^{-1}$ ($F_{H2}=2286$ ml/h, $F_{CO}=3047$ ml/h, and $F_{SO2}=2667$ ml/h; and 1 g of Cat-S); and 440° C.
Figure 5:
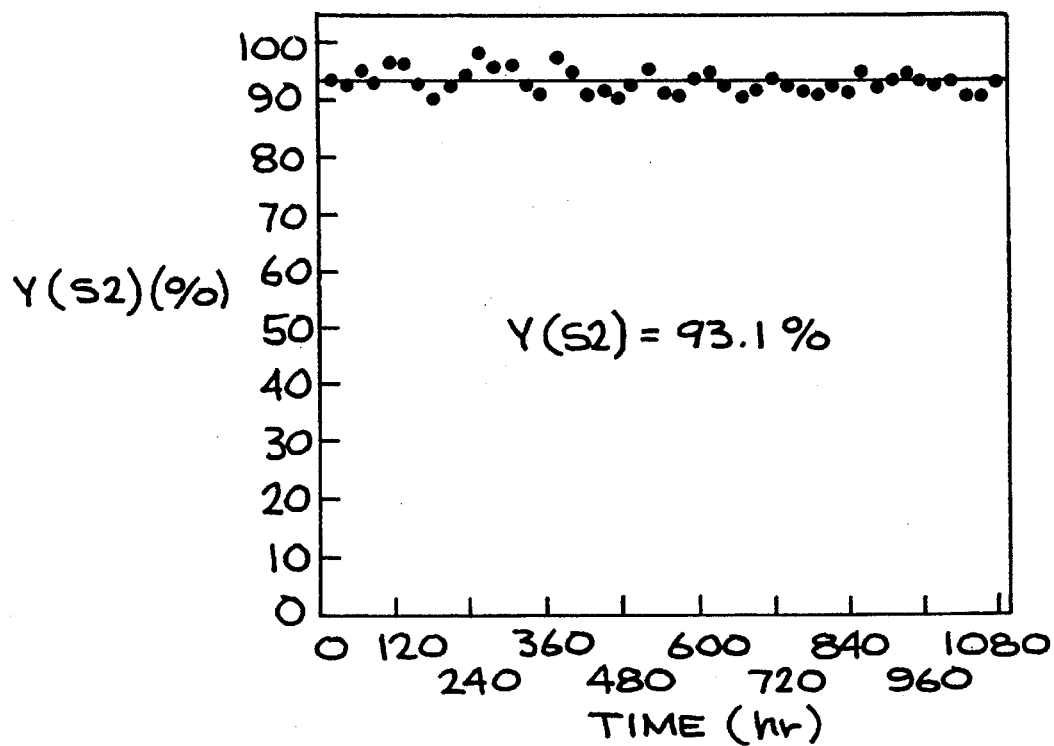
FIG. 5. shows the yield of elemental sulfur as a function of reaction time for the Cat-S at feed gas molar ratios: $(H_2/CO)=0.75$, and $[(H_2+CO)/SO_2]=2$; S.V.=10,000 $h^{-1}$ ($F_{H2}=2286$ ml/h, $F_{CO}=3047$ ml/h, and $F_{SO2}=2667$ ml/h; and 1 g of Cat-S); and 440° C.
Figure 6:
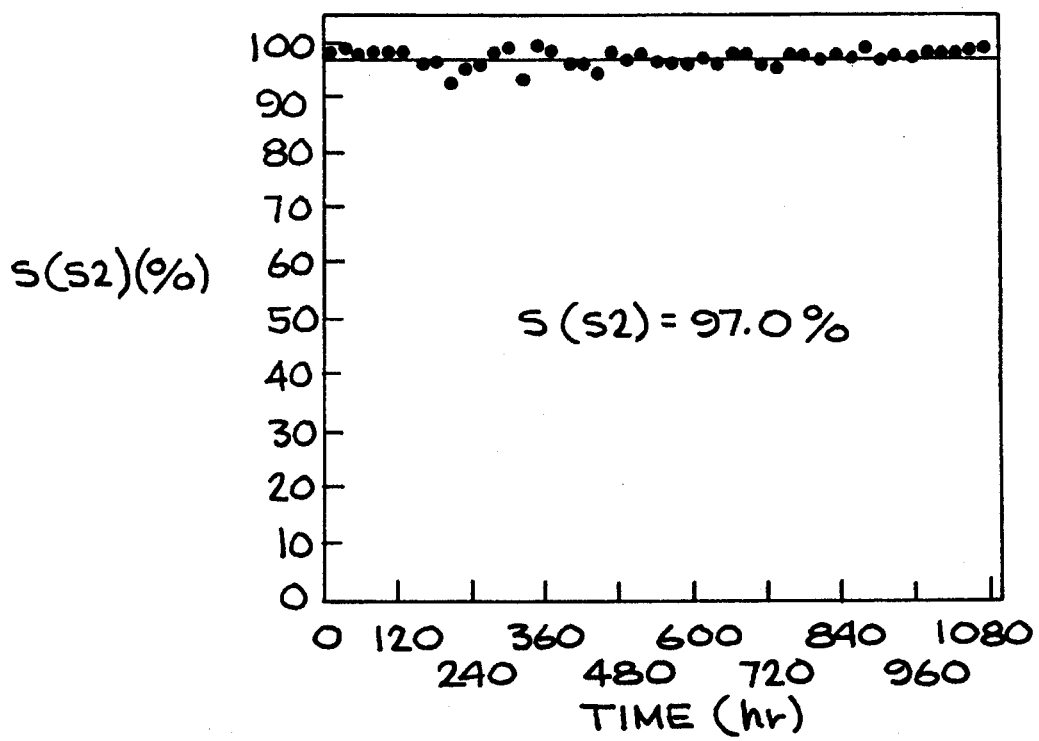
FIG. 6. shows the selectivity of elemental sulfur as a function of reaction time for the Cat-S at feed gas molar ratios: $(H_2/CO)=0.75$, and $[(H_2+CO)/SO_2]=2$; S.V.=10,000 $h^{-1}$ ($F_{H2}=2286$ ml/h, $F_{CO}=3047$ ml/h, and $F_{SO2}=2667$ ml/h; and 1 g of Cat-S); and 440° C.
Figure 7:
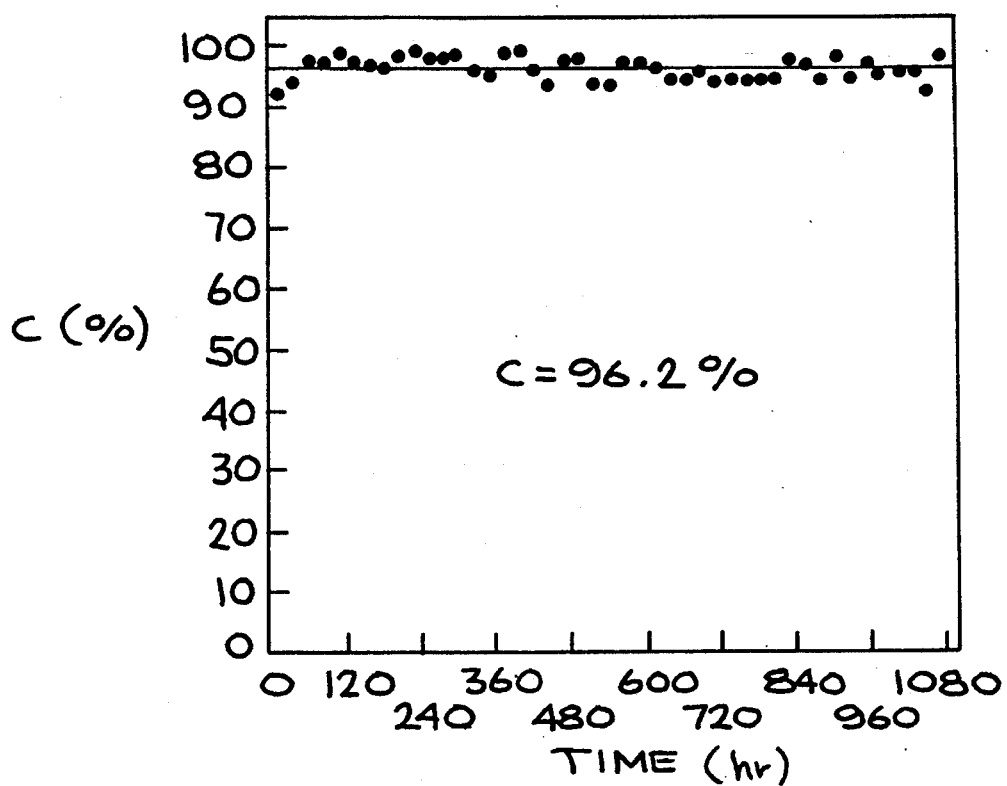
FIG. 7. shows the conversion of $SO_2$ as a function of reaction time for the Cat-S at feed gas molar ratios: $(H_2/CO)=0.75$, and $[(H_2+CO)/SO_2]=2$; S.V.=10,000 $h^{-1}$ ($F_{H2}=2286$ ml/h, $F_{CO}=3047$ ml/h, and $F_{SO2}=2667$ ml/h; and 1 g of Cat-S); and 460° C.
Figure 8:
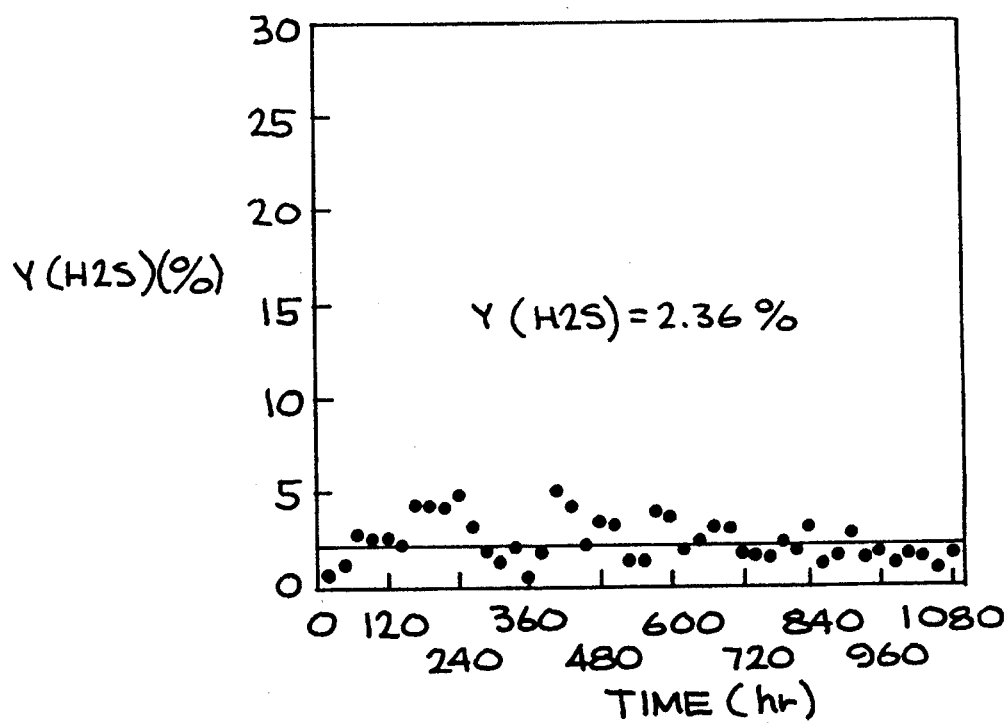
FIG. 8. shows the yield of $H_2S$ as a function of reaction time for the Cat-S at feed gas molar ratios: $(H_2/CO)=0.75$, and $[(H_2+CO)/SO_2]=2$; S.V.=10,000 $h^{-1}$ ($F_{H2}=2286$ ml/h, $F_{CO}=3047$ ml/h, and $F_{SO2}=2667$ ml/h; and 1 g of Cat-S); and 460° C.
Figure 9:
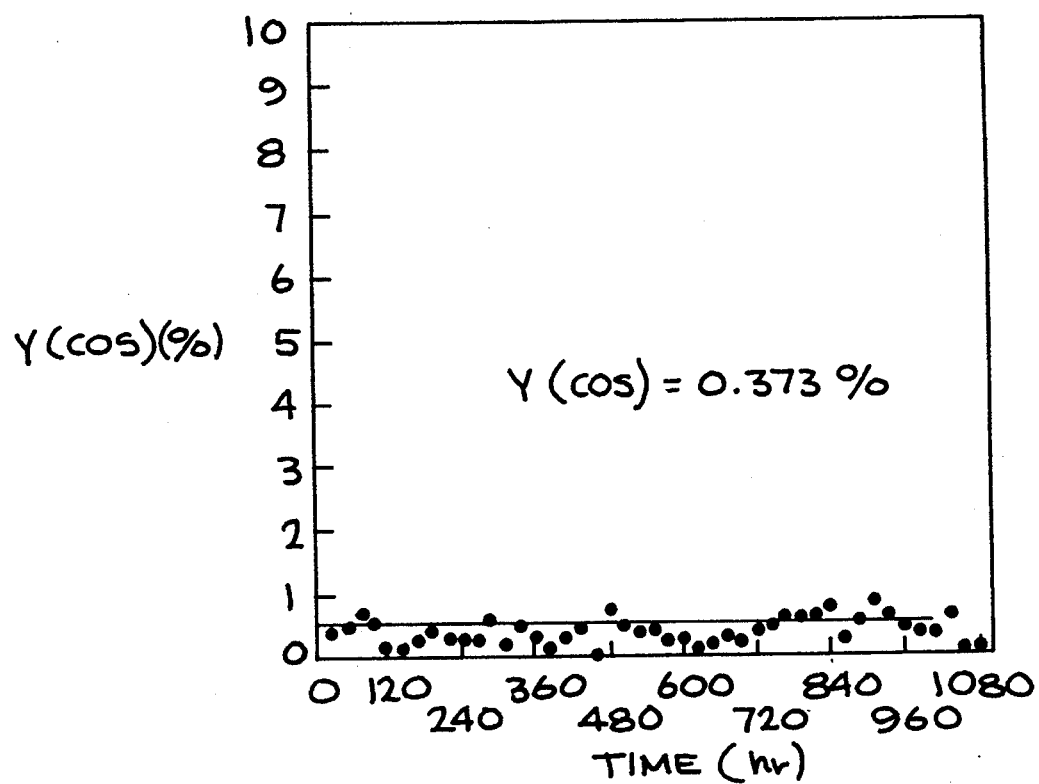
FIG. 9. shows the yield of COS as a function of reaction time for the Cat-S at feed gas molar ratios: $(H_2/CO)=0.75$, and $[(H_2+CO)/SO_2]=2$; S.V.=10,000 $h^{-1}$ ($F_{H2}=2286$ ml/h, $F_{CO}=3047$ ml/h, and $F_{SO2}=2667$ ml/h; and 1 g of Cat-S); and 460° C.
Figure 10:
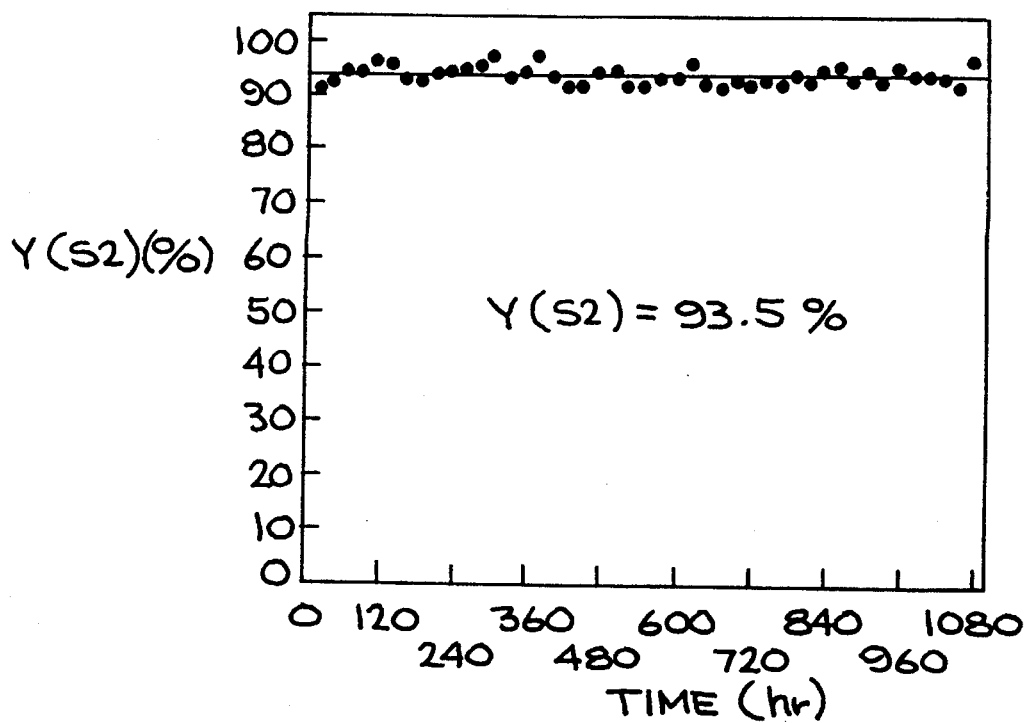
FIG. 10. shows the yield of elemental sulfur as a function of reaction time for the Cat-S at feed gas molar ratios: $(H_2/CO)=0.75$, and $[(H_2+CO)/SO_2]=2$; S.V.=10,000 $h^{-1}$ ($F_{H2}=2286$ ml/h, $F_{CO}=3047$ ml/h, and $F_{SO2}=2667$ ml/h; and 1 g of Cat-S); and 460° C.
Figure 11:
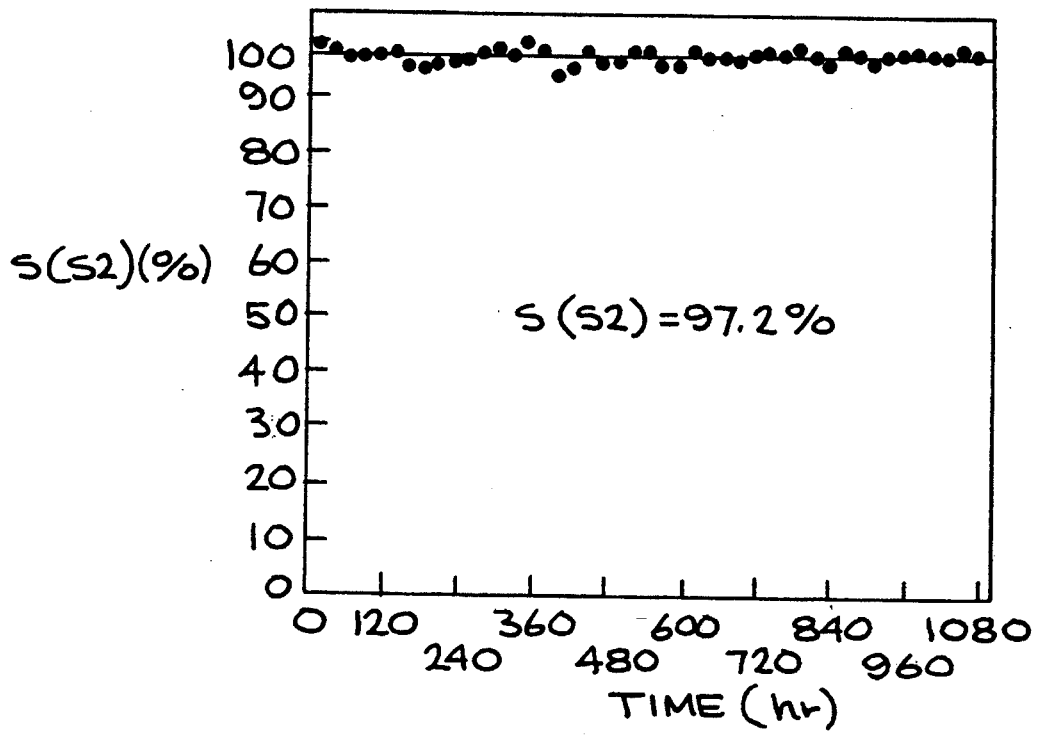
FIG. 11. shows the selectivity of elemental sulfur as a function of reaction time for the Cat-S at feed gas molar ratios: $(H_2/CO)=0.75$, and $[(H_2+CO)/SO_2]=2$; S.V.=10,000 $h^{-1}$ ($F_{H2}=2286$ ml/h, $F_{CO}=3047$ ml/h, and $F_{SO2}=2667$ ml/h; and 1 g of Cat-S); and 460° C.
Figure 12:
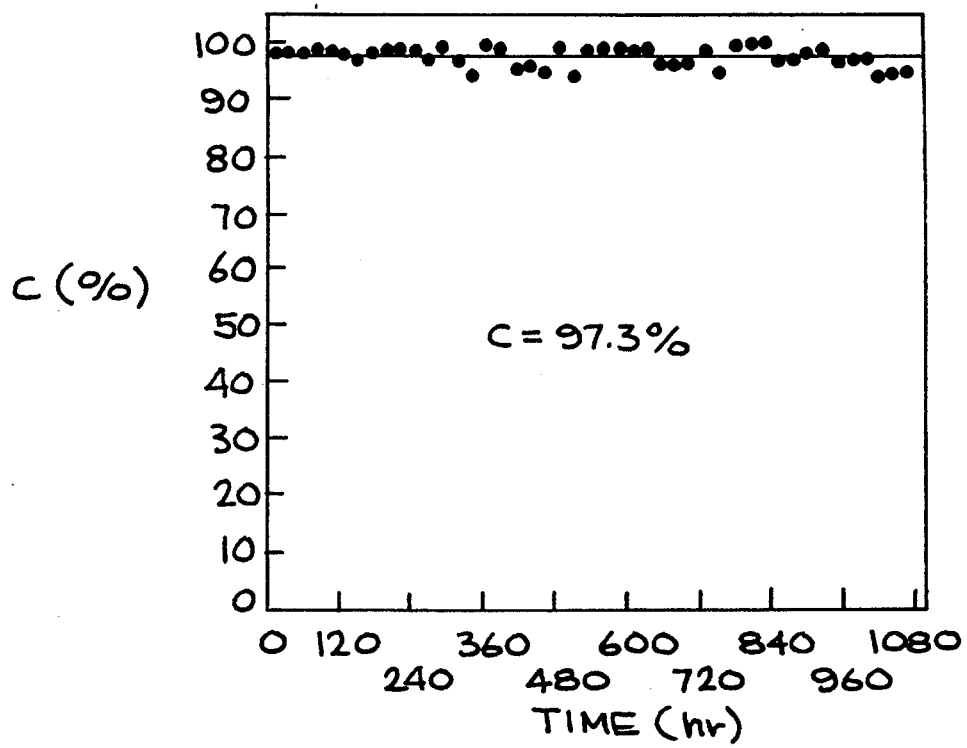
FIG. 12. shows the conversion of $SO_2$ as a function of reaction time for the Cat-S at feed gas molar ratios: $(H_2/CO)=0.75$, and $[(H_2+CO)/SO_2]=2$; S.V.=10,000 $h^{-1}$ ($F_{H2}=2286$ ml/h, $F_{CO}=3047$ ml/h, and $F_{SO2}=2667$ ml/h; and 1 g of Cat-S); and 480° C.
Figure 13:
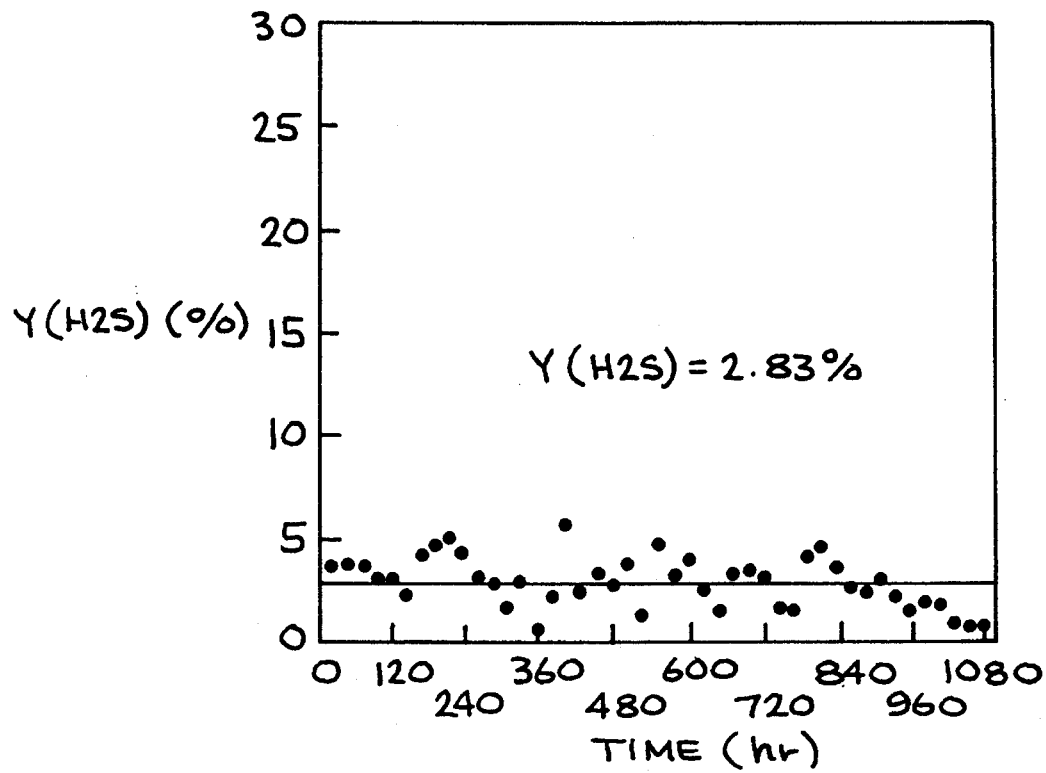
FIG. 13. shows the yield of $H_2S$ as a function of reaction time for the Cat-S at feed gas molar ratios: $(H_2/CO)=0.75$, and $[(H_2+CO)/SO_2]=2$; S.V.=10,000 $h^{-1}$ ($F_{H2}=2286$ ml/h, $F_{CO}=3047$ ml/h, and $F_{SO2}=2667$ ml/h; and 1 g of Cat-S); and 480° C.
Figure 14:
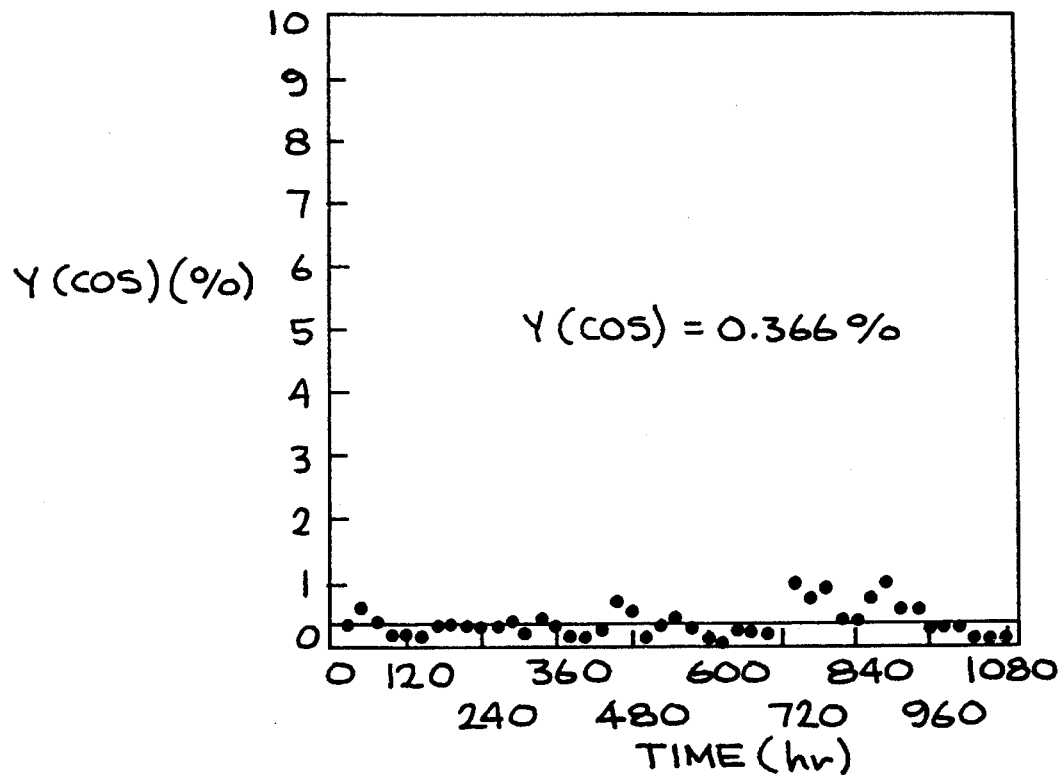
FIG. 14. shows the yield of COS as a function of reaction time for the Cat-S at feed gas molar ratios: $(H_2/CO)=0.75$, and $[(H_2+CO)/SO_2]=2$; S.V.=10,000 $h^{-1}$ ($F_{H2}=2286$ ml/h, $F_{CO}=3047$ ml/h, and $F_{SO2}=2667$ ml/h; and 1 g of Cat-S); and 480° C.
Figure 15:
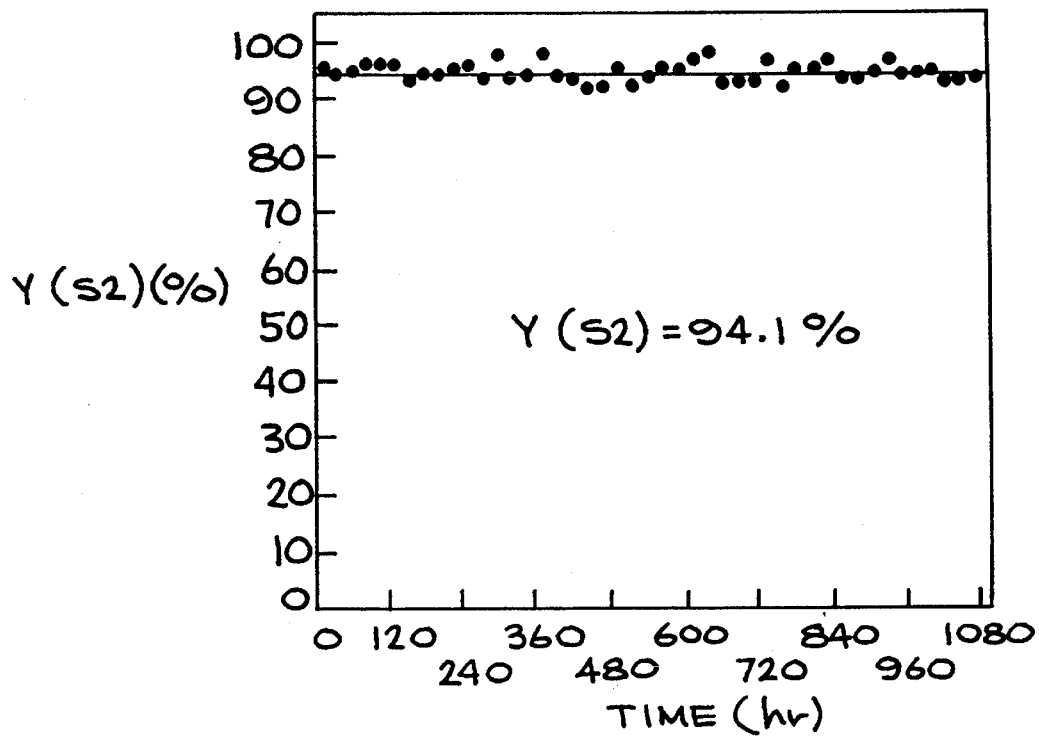
FIG. 15. shows the yield of elemental sulfur as a function of reaction time for the Cat-S at feed gas molar ratios: $(H_2/CO)=0.75$, and $[(H_2+CO)/SO_2]=2$; S.V.=10,000 $h^{-1}$ ($F_{H2}=2286$ ml/h, $F_{CO}=3047$ ml/h, and $F_{SO2}=2667$ ml/h; and 1 g of Cat-S); and 480° C.
Figure 16:
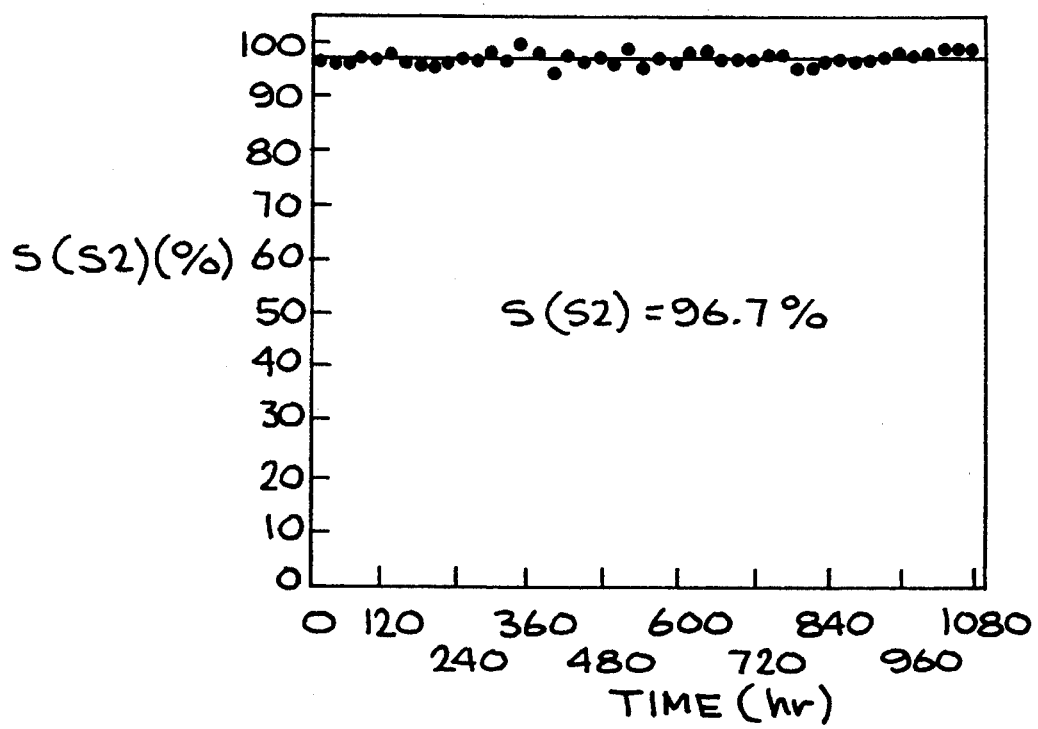
FIG. 16. shows the selectivity of elemental sulfur as a function of reaction time for the Cat-S at feed gas molar ratios: $(H_2/CO)=0.75$, and $[(H_2+CO)/SO_2]=2$; S.V.=10,000 $h^{-1}$ ($F_{H2}=2286$ ml/h, $F_{CO}=3047$ ml/h, and $F_{SO2}=2667$ ml/h; and 1 g of Cat-S); and 480° C.
Figure 17:
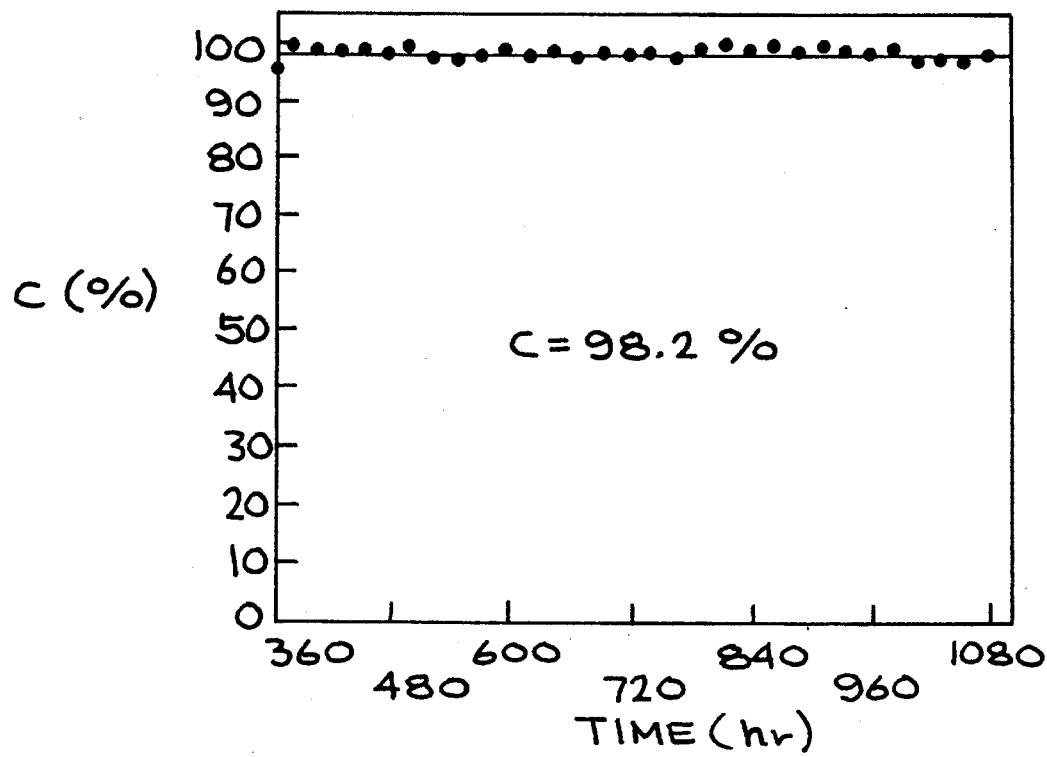
FIG. 17. shows the conversion of $SO_2$ as a function of reaction time for the Cat-S at feed gas molar ratios: $(H_2/CO)=3.0$, and $[(H_2+CO)/SO_2]=2$; S.V.=10,000 $h^{-1}$ ($F_{H2}=$ 4000 ml/h, $F_{CO}=1333$ ml/h, and $F_{SO2}=2667$ ml/h; and 1 g of Cat-S); and 480° C.
Figure 18:
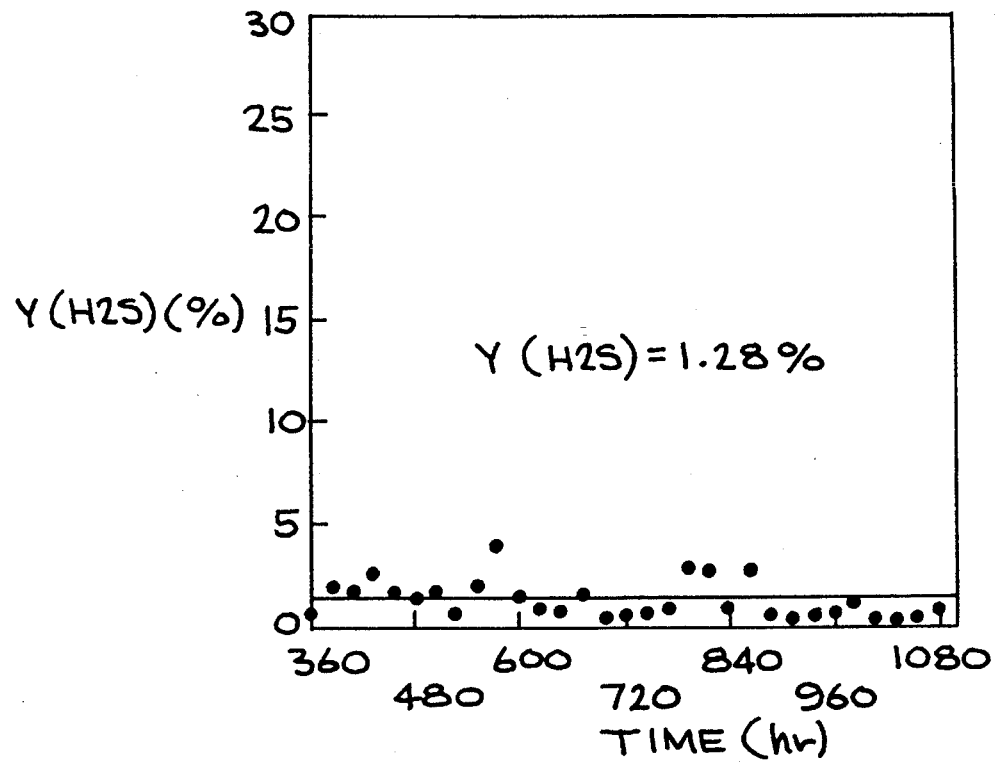
FIG. 18. shows the yield of $H_2S$ as a function of reaction time for the Cat-S at feed gas molar ratios: $(H_2/CO)=3.0$, and $[(H_2+CO)/SO_2]=2$; S.V.=10,000 $h^{-1}$ ($F_{H2}=4000$ ml/h, $F_{CO}=1333$ ml/h, and $F_{SO2}=2667$ ml/h; and 1 g of Cat-S); and 480° C.
Figure 19:
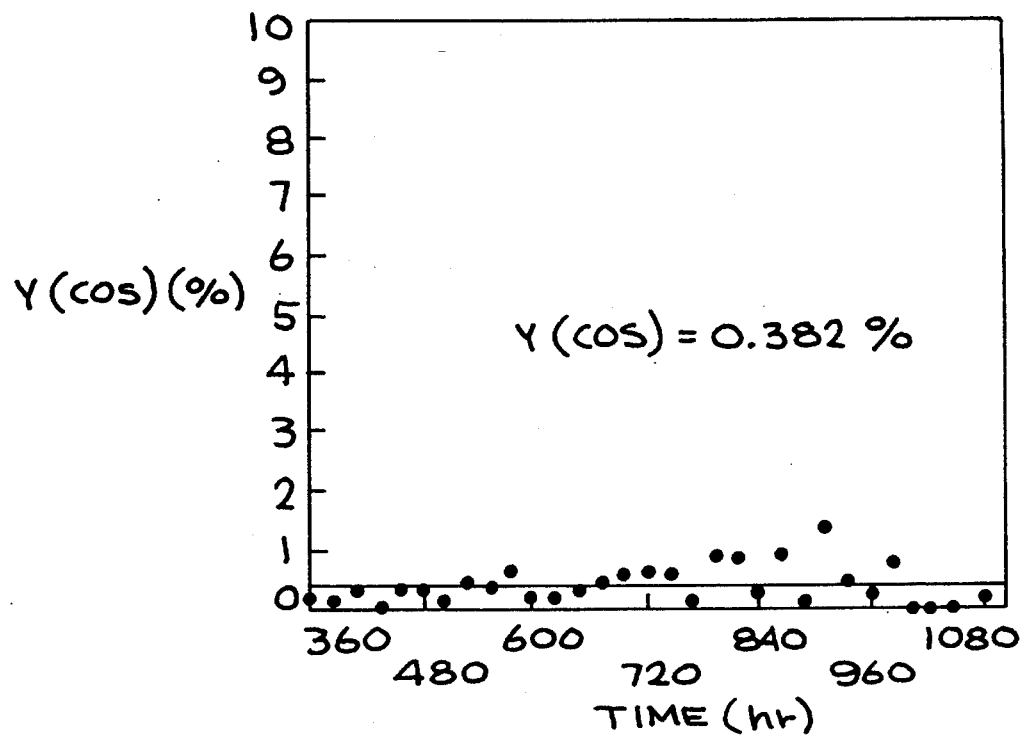
FIG. 19. shows the yield of COS as a function of reaction time for the Cat-S at feed gas molar ratios: $(H_2/CO)=3.0$, and $[(H_2+CO)/SO_2]=2$; S.V.=10,000 $h^{-1}$ ($F_{H2}=4000$ ml/h, $F_{CO}=1333$ ml/h, and $F_{SO2}=2667$ ml/h; and 1 g of Cat-S); and 480° C.
Figure 20:
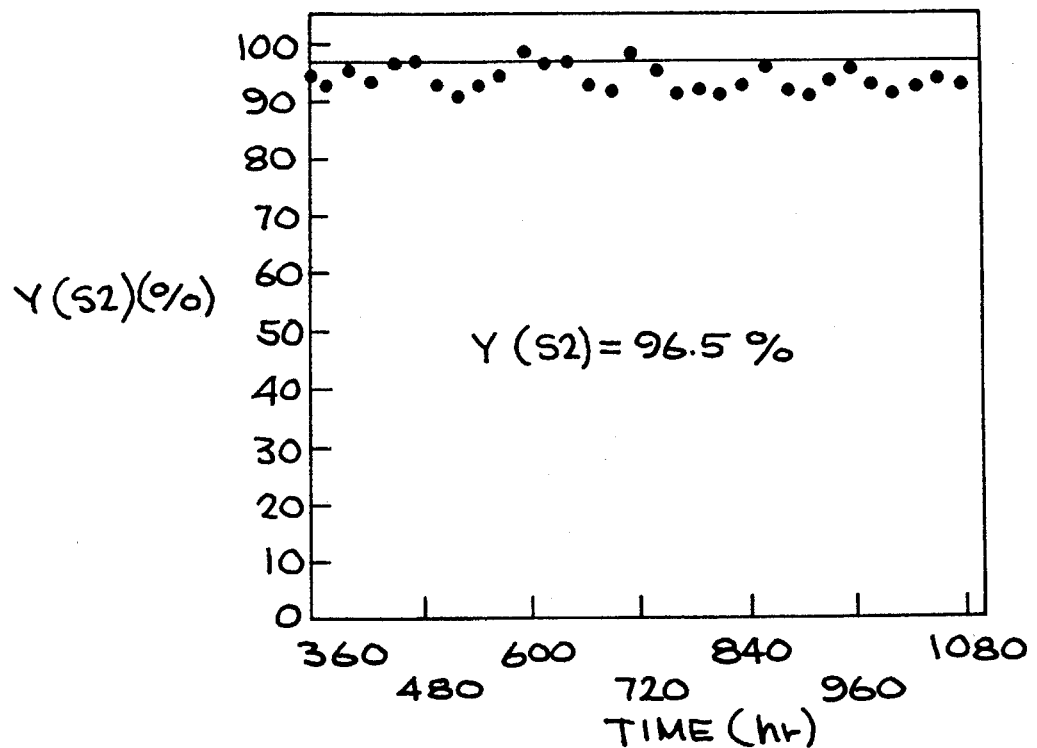
FIG. 20. shows the yield of elemental sulfur as a function of reaction time for the Cat-S at feed gas molar ratios: $(H_2/CO)=3.0$, and $[(H_2+CO)/SO_2]=2$; S.V.=10,000 $h^{-1}$ ($F_{H2}=4000$ ml/h, $F_{CO}=1333$ ml/h, and $F_{SO2}=2667$ ml/h; and 1 g of Cat-S); and 480° C.
Figure 21:
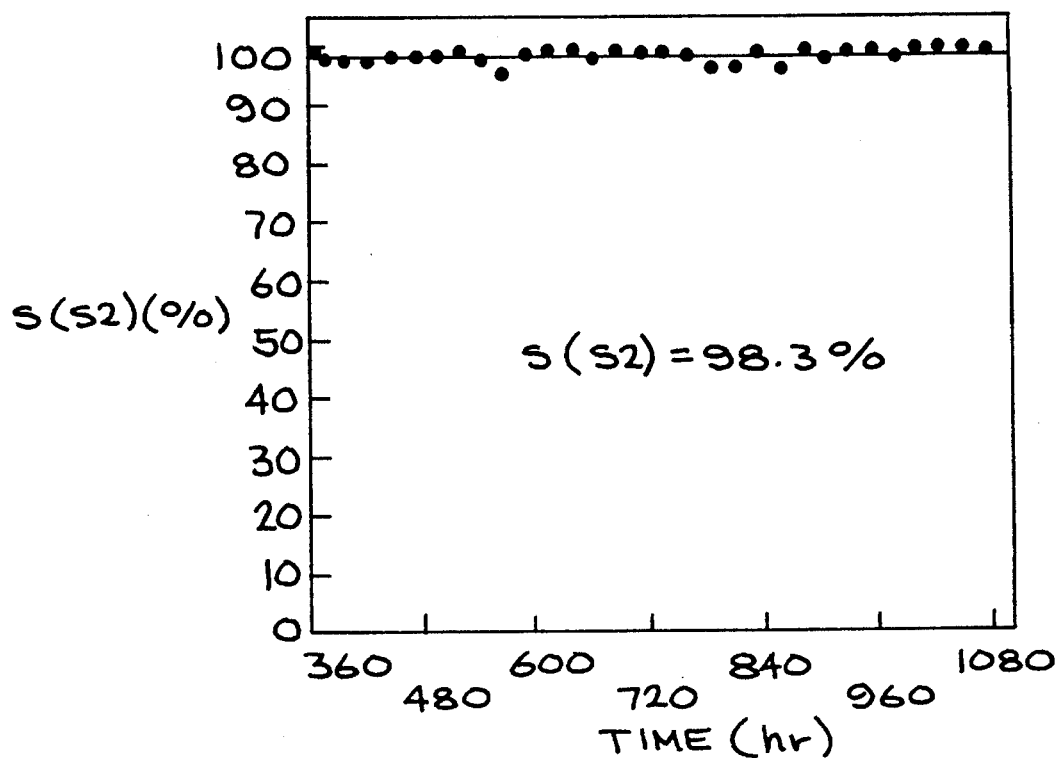
FIG. 21. shows the selectivity of elemental sulfur as a function of reaction time for the Cat-S at feed gas molar ratios: $(H_2/CO)=3.0$, and $[(H_2+CO)/SO_2]=2$; S.V.=10,000 $h^{-1}$ ($F_{H2}=4000$ ml/h, $F_{CO}=1333$ ml/h, and $F_{SO2}=2667$ ml/h; and 1 g of Cat-S); and 480° C.

The present inventive process and unique catalyst formulations represent a dramatic advance over prior art methods and catalysts in the area of sulfur dioxide conversion to elemental sulfur. The present inventive catalysts and methods provide for an unprecedented level of conversion, with a very high space velocity. By another inventive advance, a method is provided to reconvert the few remaining waste gases so as to provide an even greater net level of conversion. The inventive advances so provided are of particular importance because they bring this technology to a level that will allow its practical commercial application to industrial sulfur dioxide emissions.

Catalyst Composition The present invention allows for the production of a range of catalysts with particularly advantageous application to sulfur dioxide reduction. The catalysts are composed of a mixture of common transition metal oxides supported on alumina, and as a result are relatively inexpensive to manufacture. Additionally, because of the highly advantageous space velocity achieved by the inventive formulations, the capital investment required to produce the inventive catalysts as compared to prior art methods is much reduced because of the capability of using a small catalytic reactor to achieve a high $SO_2$ conversion.

The inventive catalysts required only a stoichiometric amount of synthesis gas or natural gas for the reduction process to be accomplished. As a result, the waste of fuel required by the present invention is negligible and the operating cost of a scrubber incorporating the inventive technology is surprisingly small.

The inventors have discovered that the correct combination of certain classes of elements are highly likely to produce catalysts with unexpected, advantageous characteristics. The particular formulations specified in the Example section which follows are merely examples of a wide range of catalytic formulations which can be produced using the insight of the present inventive approach. Such variants will be apparent to the ordinary skilled artisan. Of particular importance to the present invention is the balancing between the qualities of the components, and the unexpected synergism among their apparently inapposite functions.

The discussion which follows describes the inventor's hypothesis as to the functions and integration of the various components of the invention. However, it may be that further or alternative theories may in fact more correctly characterize the mode of function of the present invention.

Several embodiments of the present invention are comprised of four materials. This minimum of four materials appears necessary to imbue the inventive formulation with the necessary unexpected working parameters. However, the most advantageous formulation comprises six or more chemical components.

It appears that Fe, Ni, and Co, combined with Mo, Mn, or Cr in varying proportion provides a very good result. Typically, such a formulation allows the achievement of the critical 90% yield of sulfur. To achieve a yield of sulfur of over 92%, a six component formulation is preferable.

In general, the materials which comprise the inventive catalyst formulation fall into three categories. The first category of components for the inventive formulation is characterized by a very high conversion of $SO_2$. Because of the synergism of the other components of the formulation, the materials for the first component can be chosen from among highly aggressive converters despite a very poor or complete lack of specificity for the ultimately desired reaction. A combination of materials with such qualities can be usefully employed as the first component in the present inventive formulation. Fe is a typical example of a suitable material for the first component in the inventive formulation.

The second category of components in the inventive formulation is contrasted from the first component by its high specificity. Concomitantly, this quality is emphasized in this particular component, generally at the cost of the overall conversion rates. Again, this component can be a mixture of materials meeting the basic parameters of this category. Typical examples of materials which can be effectively employed as this component are Mo, Mn and Cr. Other appropriate materials are Se, Mg, Cu, and Zn, or any combination of these or the above materials.

The third category of components comprises materials with characteristics intermediate to the first and second components. That is, these components tend to have some, but not striking, specificity of conversion. On the other hand, they have a reasonably aggressive conversion rate. Typical of the components which are useful in this category are Mn and Co. Ni can also be employed for this purpose.

The proportions of the components in the formulation are pivotal to its unexpectedly useful functioning parameters. Fe is typically provide in a 1–8 atomic ratio. The Ni component is provide at 0.5–3 atomic ratio, as is the Co component. For the final category, Mo, Mn and Cr can be provided singly or in varying proportions to make up the totality of this category's contribution to the catalyst. The total amount of this final category is provide in the range of 0.5–2 atomic ratio. The surface of the invention catalyst can be in the form of a stabilizing crystalline structure, such as a spinel or perovskite structure.

One embodiment of the inventive process for producing the present inventive catalyst includes the following steps:

1) impregnating a carrier with a solution of all the components which are metal nitrates, 2) heating the impregnated carrier to about 100°–150° C. for about 15 minutes to 1 hour, 3) baking the carrier at about 400° C. for about 15 minutes to hour, 4) baking the carrier at between 600° C. and 1,000° C. for about 4 hours, and 5) ceasing heating, allowing the structure to equilibrate naturally to ambient temperatures with gradual cooling.

In some cases, it is useful for the temperature in step 4 to be maintained at about 820° C.

When Mo is employed as a component of the metal nitrates, the impregnation step 1) is modified. In that case, the following extra steps are employed;

a) treating the support with an aqueous, acidic solution containing all components except Mo, b) allowing the aqueous component of said solution to evaporate and, c) treating said impregnated carrier with an aqueous, basic solution containing Mo.

Parameters of Operation Another important aspect of the present invention is that both the present inventive catalytic formulation as well as prior art formulations can be employed in a new and inventive manner to provide highly unexpected and advantageous operating parameters. It has been discovered by the present inventors that if the catalyst is employed at a high temperature level at the start of the treatment cycle, the conversion rate will improve dramatically. The inventive catalyst can achieve a sulfur yield of 95% or more, and a space velocity from about $8,000^{-1}$ to $12,000^{h-1}$ using synthesis gas as the feed stock. When using methane gas as the feed stock, the inventive catalyst achieves a space velocity from about $1,000^{h-1}$ to $8,000^{h-1}$.

The prior art references of $SO_2$ conversion to elemental sulfur are highly discouraging about conducting the catalytic process at the relatively high temperatures practiced by the present invention. Note that the report by Akhmedov et. al., (Zh. Prikl. Khim., Vol. 8, p 1891, 1988), Table 3 shows a 72.8% yield at 300° C., a 66.9% yield at 350° C., and a 63.2% yield at 400° C., all at 2,000 S.V. $h^{-1}$. This shows a steady decrease of yield at increasing temperatures. A similar finding was reported by Akhmedov, et al (Zh. Prikl. Khim., p. 16, 1988), where the yield was 72.8% at 250° C., 82.0% at 300° C., 79.2% at 350° C., and 64.7% at 400° C. with all tests at 500 S.V. $h^{-1}$. This second article demonstrates the long held belief of the practitioners in this art that optimal temperatures in terms of yield hovered around the 300° C. point.

Even more unexpectedly, the highly advantageous inventive conversion of $SO_2$ will be sustained during a continuous run even if the temperature is subsequently lowered. This surprising phenomena has never before been noted because the prior art researchers, due to the prevailing view among practitioners, ran their conversion attempts at or below 400° C. for short periods of time. While the inventive optimization method can be used with excellent results with the inventive catalysts, it also enjoys applications to other prior art catalysts.

The present inventors noted an unexpected, but subtle increase in conversion of $SO_2$ when they carried out the process continuously at an unprecedented 480° C. for an extended period of time. After 6-8 hours, a very dramatic increase to 92% in conversion of $SO_2$ was observed. Encouraged by these surprising results, the inventors increased the temperature to 700° C., and found that the dramatic increase in conversion of $SO_2$ was achieved in only 2–4 hours. The inventors then discovered that the temperatures may subsequently be dropped to normal operating temperatures without the loss of this high conversion of $SO_2$, as long as the process is continuous, and temperatures are not allowed to drop to substantially lower levels. The same result can be achieved by initially running the reaction at 800° C. for two hours. At 400° C. for around 6–8 hours, a yield of 90% is also accomplished.

Reprocessing of Waste Gases. Another aspect of the present invention is the ability to reprocessed waste gases produced during the conversion of sulfur dioxide. These undesirable waste gases can include hydrogen sulfide, carbonyl sulfide, and carbon disulfide.

In the inventive reprocessing method, one can recycle the byproducts back into the catalytic reactor; these byproducts are believed by the inventors to react with $SO_2$ to yield sulfur. Experiments were conducted to determine the effect of recycling $H_2S$ and COS. These are described in Example 4. These undesirable waste gases are pollutants and must not be released to the atmosphere. Treatment of these waste gases is thus required. One possible route is the combustion of these waste gases to form $SO_2$ which can be reabsorbed by the aforementioned flue gas desulfurization regeneration processes. However, this route will increase the amount of $SO_2$ emissions from these desulfurization processes, because of the increase of $SO_2$ input loading. Another route is the development of a catalyst which is capable of promoting the consumption of these waste gases by $SO_2$ to produce elemental sulfur. In this way, the unwanted waste gases can then be recycled back to the feed gas for subsequent conversion on the catalyst without resulting in further accumulation of these unwanted sideproducts.

EXAMPLES

EXAMPLE 1: Catalyst Preparation and Characterization

Catalysts were composed of active metal oxides supported on carriers. The combination of several metal oxides and carriers were formulated. Catalysts were prepared by impregnating the carriers with solutions of metal nitrates. By mixing appropriate amounts of metal nitrate solutions with a given carrier, the mixture was heated to about 100° C. to 150° C. to evaporate the water component. The solid mixtures were then placed in an oven and subjected to stepwise heating between 200° and 1000° C. for about 0.5 to 20 h, while a gas stream of nitrogen was gently passed through the air space above the mixture continuously during the entire process of heating. This was done to remove oxides of nitrogen which were produced as a result of thermal decomposition of nitrate salts. In some cases, the stream was not used. Carriers evaluated included silica ($SiO_2$), r-alumina (r-$Al_2O_3$), Molecular sieves 5A and 13X. Metal nitrates employed included $Fe(NO_3)_3$ 9 $H_2O$, $Co(NO_3)_3$ 6 $H_2O$, $Ni(NO_3)_2$ 6 $H_2O$, $Cr(NO_3)_3$, 6 $H_2O$, $Mn(NO_3)_2$ 4 $H_2O$, and $Cu(NO_3)_2$ 6 $H_2O$. Instead of nitrate salts, $H_2SeO_3$ and $(NH_4)_6MO_7O_{24}$ $4H_2O$ were used for selenium and molybdenum components. The composition of catalysts can be represented by $Fe_aCo_bNi_cCr_dMo_eMn_fSe_gCu_hZn_iMg_jO_x$, where a, b, c, d, e, and f were independently ranged between 0 and 30; g and h were between 0 and 10; i and j were between 0 and 5; and x was determined by the charge balance of the catalysts. The ratio of active catalyst to carrier was between 0 and 0.8 by weight.

The prepared catalysts were characterized by a combination of several analytical methods. The surface area was measured before and after experimentation by using a BET surface area analyzer. The composition of the catalysts was determined by means of X-ray diffraction (XRD) and atomic absorption.

Apparatus and Procedure. Experiments were carried out between 340° and 480° C. at 20 degree intervals. The space velocity ranged from, 1,000 h$^{-1}$ to 15,000 h$^{-1}$ at about 1250 h$^{-1}$ intervals. The molar ratio of the sum of H$_2$ and CO to SO$_2$ ranged from 1.4 to 3.0, while the molar ratio of H$_2$ and CO varied from 0.3 to 3 to cover the entire composition range of synthesis gas produced from different types of coal and from methane.

A schematic flow diagram of the apparatus is shown in FIG. 1. The experimental setup consisted of three separate sections: the gas supply section, the main reactor, and the detection and analysis section. Gases were supplied from compressed gas cylinders (Matheson Gas Products) including CO$_2$ cylinder (1), CO cylinder (2), and H$_2$ cylinder (3), to gas flow meters (4) before entering a gas mixer (5). The tubular reactor (10) was fabricated from a 1.4-cm-o.d. with a 1-mm wall thickness quartz tube. The entire reactor was mounted inside a tubular furnace (11). The reactor (10), which was 5 cm long, consisted of three zones. The inlet or the preheating zone (2.5 cm long) was packed with 20 mesh quartz chips, the reaction zone (1.5 cm long) was packed with 30–40 sieve activated alumina catalyst particles, and the outlet zone (1 cm long) was packed with quartz chips (20 mesh), mainly for purpose of supporting the catalyst, which sat on a perforated quartz plate having seven holes for gas exit. A thermocouple (19), reaching the center of the catalytic packing, provided measurement of the temperature of catalytic reactions. A variable transformer (8) was used to control the amount of power applied to the furnace. The catalytic reaction was studied at temperatures which could be maintained at a desired value by a temperature control (7). The temperature readout-out was on a temperature determinator (6). After the last section of the reactor, the gases passed through a sulfur collector (13) at room temperatures, and then entered into an on-line trap cooled in an ice bath (14) to condense water before entering a six-port sampling valve which was used to inject the products of the catalytic reactions into the gas chromatograph (15). Finally, the exit gases passed into a scrubber (17) containing concentrated NaOH.

The inlet and exit gases were analyzed by using a gas chromatograph equipped with a column switching valve and a thermal conductivity detector. A 2-meter Porapak QS (80–100 mesh) column was employed. The operating conditions were at 60 mA and at column temperature of 100° C. The carrier gas was helium. An integrator (16) was used to measure the peak areas on the gas chromatogram in order to determine the concentration of chemical species quantitatively.

Calculation and Definition. The catalytic conversion of SO$_2$ to elemental sulfur by synthesis gases or methane often produce unwanted side products such as H$_2$S, COS, and CS$_2$. The success of a process for the reduction of SO$_2$ will partly depend on the development of a catalyst which will maximize the selectivity of elemental sulfur over side byproducts. The conversion efficiency of SO$_2$, the yield of the side products, and the selectivity of elemental sulfur were evaluated for different formulations of catalysts.

The conversion (%) of SO$_2$ (C) was calculated by $$C=100\ (F^i{}_{SO2}-F^o{}_{SO2})/F^i{}_{SO2}$$

while, the $F^i{}_{SO2}$ was the flow rate (ml/h) of input SO$_2$, and $F^o{}_{SO2}$ was the flow rate of output SO$_2$.

The yield (%) of hydrogen sulfide ($Y_{H2S}$), carbonyl sulfide ($Y_{COS}$), and elemental sulfur ($Y_{2S}$) was respectively calculated by $$Y_{H2S}=100\ F_{H2S}/F^i{}_{SO2},$$

$$Y_{COS}=100\ F_{COS}/F^i{}_{SO2},\ \text{and}$$

$$Y_{S2}=C-Y_{H2S}-Y_{COS}$$

while, $F_{H2S}$ and $F_{COS}$ were the flow rate (ml/h) of H$_2$S and COS output respectively.

The selectivity (%) of elemental sulfur ($S_{S2}$) was calculated by $$S_{S2}=Y_{S2}/(Y_{S2}+Y_{H2S}+Y_{COS})$$

The space velocity (S.V.) was defined as $$S.V.=F^{Total}/V_{cat}\ (h^{-1})$$

while $F^{Total}$ was the sum of the flow rates (ml/h) of all input gases i.e., $F^{Total}=F^i{}_{SO2}+F^i{}_{CO}+F^i{}_{H2}$, and $V_{cat}$ was the volume (ml) of the catalyst.

EXAMPLE 2. Evaluation of Catalysts

Several prepared catalysts were evaluated. The results were summarized:

Catalyst 1: Co$_3$O$_4$/13X (cobalt nitrate impregnated on molecular sieve 13X); the ratio of the active component to the carrier was 0.3 by weight. The result was C= 21.4%, $Y_{H2S}$=0, $Y_{COS}$=3.53%, $Y_{S2}$=18.2%, and $S_{S2}$= 83.3% under the following experimental conditions: $F_{H2}$=4000 ml/h, $F_{CO}$=1333 ml/h, $F_{SO2}$ 2667 ml/h, S.V.=10,000 h$^{-1}$ and at 470° C.

Catalyst 2: Co$_3$O$_4$/5A (cobalt nitrate impregnated on molecular sieve 5X); the ratio of the active component to the carrier was 0.3 by weight. The result showed that C=29.0%, $Y_{COS}$=5.58%, $Y_{S2}$=23.3%, and $S_{S2}$= 80.4% under the following experimental conditions: $F_{H2}$=4000 ml/h, $F_{CO}$=1333 ml/h, $F_{SO2}$=2667 ml/h, S.V.=10,000 h$^{-1}$ and at 530° C.

Catalyst 3: Fe$_2$O$_3$/gamma-Al$_2$O$_3$ (a mixture of ferric nitrate impregnated on r-Al$_2$O$_3$); the ratio of the active component to the carrier was 0.3 by weight. The result showed that C=38.0%, $Y_{S2}$=75.4%, and $S_{S2}$ =93.0% under the following experimental conditions: $F_{H2}$=4000 ml/h, $F_{CO}$= 1333 ml/h, $F_{SO2}$ −2667 ml/h, S.V.=10,000 h$^{-1}$ and at 440° C.

Catalyst 4: Fe$_{0.5}$Co$_{0.5}$Ni$_{1.0}$O$_{2.5}$/SiO$_2$ (a mixture of ferric nitrate, cobalt nitrate, and nickel nitrate impregnated on SiO$_2$); the ratio of the active component to the carrier was 0.2 by weight. The result showed that C=97.2%, $Y_{S2}$= 34.8%, and $S_{S2}$ =35.8% with the remaining products being primarily H$_2$S under the following experimental conditions: $F_{H2}$=2679 ml/h, $F_{CO}$=893 ml/h, $F_{SO2}$=1428 ml/h, S.V.=6,250 h$^{-1}$ and at 320° C.

Catalyst 5: Fe$_{1.0}$Co$_{0.5}$Ni$_{0.50}$O$_{2.75}$/SiO$_2$ (a mixture of ferric nitrate, cobalt nitrate, and nickel nitrate impregnated on SiO$_2$); the ratio of the active component to the carrier was 0.2 by weight. The result showed that C=82.3%, $Y_{S2}$= 41.9%, and $S_{S2}$ =50.9% with the remaining products being primarily H$_2$S under the following experimental conditions: $F_{H2}$=2000 ml/h, $F_{CO}$=667 ml/h, $F_{SO2}$=1333 ml/h, $F_{N2}$=1000 ml/h, S.V.=6,250 h$^{-1}$ and at 440° C.

Catalyst 6: Fe$_{0.5}$Co$_{1.0}$Ni$_{0.5}$O$_{2.75}$/SiO$_2$ (a mixture of ferric nitrate, cobalt nitrate, and nickel nitrate impregnated on SiO$_2$); the ratio of the active component to the carrier was 0.2 by weight. The result showed that C=82.4%, $Y_{S2}$= 43.9%, and $S_{S2}$ =53.3% with the remaining products being primarily H$_2$S under the following experimental conditions: $F_{H2}$=2000 ml/h, $F_{CO}$=667 ml/h, $F_{SO2}$=1333 ml/h, $F_{N2}$=1000 ml/h, S.V.=6,250 h$^{-1}$ and at 440° C.

Catalyst 7: $Fe_{2.0}Co_{2.0}Ni_{1.0}Mo_{1.0}O_{10.0}/Al_2O_3$ (a mixture of ferric nitrate, cobalt nitrate, nickel nitrate, and molybdenum nitrate impregnated on $Al_2O_3$); the ratio of the active component to the carrier was 0.3 by weight. The result showed that C=85.8%, $Y_{H2S}$= 0.289%, $Y_{COS}$=2.49%, $Y_{S2}$=84.0%, and $S_{S2}$=97.8% under the following experimental conditions: $F_{H2}$= 4000 ml/h, $F_{CO}$=1333 ml/h, $F_{SO2}$=2667 ml/h, S.V. =10,000 h$^{-1}$ and at 440° C.

Catalyst 8: $Fe_{2.0}Co_{1.0}Ni_{2.0}Mo_{1.0}O_{9.5}/Al_2O_3$ (a mixture of ferric nitrate, cobalt nitrate, nickel nitrate, and molybdenum nitrate impregnated on $Al_2O_3$); the ratio of the active component to the carrier was 0.3 by weight. The result showed that C=91.9%, $Y_{H2S}$= 0.126%, and $Y_{COS}$=0.644% $Y_{S2}$=90.5%, and $S_{S2}$= 99.1% under the following experimental conditions: $F_{H2}$=4000 ml/h, $F_{CO}$=1333 ml/h, $F_{SO2}$=2667 ml/h, S.V.=10,000 h$^{-1}$ and at 468° C.

Lifetime Tests. One of the most promising catalyst was selected for the lifetime test. This catalyst (Cat-S) consisted of six active metal oxide components supported on gamma-$Al_2O_3$. The molar ratios of the active components were $Fe_{4.0}Co_{1.0}Ni_{1.0}Mo_{1.0}Cr_{2.0}Mn_{2.00}O_{18.33}$. The ratio of the total active components to the carrier is 0.3 by weight. The lifetime test was carried out continuously for 1080 h (45 days). The molar ratio of input gases was $(H_2+CO)/SO_2$=2.0 and $H_2/CO$=0.75. The flow rate of $H_2$, CO, and $SO_2$ were 2286, 3047, and 2667 ml/h respectively. The amount of catalyst used was 1 g. These corresponded to a space velocity of 10,000 h$^{-1}$. The catalytic activity was evaluated at three temperatures: 440°, 460°, and 480° C. for the test.

The arithmetic mean of the experimental results of each day for a total of 45 days at 440° C., 460° C., and 480° C. were tabulated in Table 1, 2 and 3A and 3B respectively. The conversion of $SO_2$, the yield of $H_2S$, COS, and $S_2$, and the selectivity of $S_2$ as a function of reaction time (days) at three temperatures were plotted in FIGS. 2 through 21. The arithmetic mean of the experimental results of all 45 days was shown in Table 4. Also given in Table 4 is the arithmetic mean of results of an additional experimental condition which was implemented after 15 days lifetime test, and used $H_2/CO$=3 to cover the composition of synthesis gas produced from methane.

The results (Tables 1, 2 and 3A and 3B and FIGS. 2–21) indicate that the activity of the Cat-S, including the conversion and the selectivity, was very stable and does not show any changes during the entire 1080 h of the lifetime test. Table 4 shows that the yield of elemental sulfur ranged between 93.1% and 96.5%, which is far superior to results so far reported in the literatures. These high yields were achieved at a space velocity of 10,000 h$^{-1}$, compared with a reported result of obtaining 69.3%–72.8% yield of elemental sulfur at a space velocity of 2,000 h$^{-1}$ and a 82.8% sulfur yield at a space velocity of only 500 h$^{-1}$. Table 4 shows that the yield of $H_2S$ ranged between 1.28 and 2.82%, which was far better than those of other catalysts: 13.4% for $NiO/Al_2O_3$ at a space velocity of 2000 h$^{-1}$, and at 400° C.; 3.80% for $Co_2O_3/Al_2O_3$ at a space velocity of 2000 h$^{-1}$, and at 300° C.; 13.9% for $NiO+Co_3O_4$ at a space velocity of 2000 h$^{-1}$ and at 450° C. In the inventor's hands, the yield of $H_2S$ increased along with the increase of the reaction temperatures. Therefore, it is remarkable to observe the low yield of $H_2S$ for the Cat-S at a temperature of 440° to 480° C.

Parametric Studies. The effect of temperatures, space velocity, and molar ratios of feed gases on the catalytic activity of the Cat-S were investigated in order to determine the optimum operating conditions.

Table 5 summarizes the results of the temperature dependence study. The experiments were carried out at a molar ratio of input feed gases $H_2/CO$=0.75 and $(H_2+CO)/SO_2$=2, and at a space velocity of 10,000 h$^{-1}$ with 1 g of the Cat-S. The yield of $H_2S$ increased with the increase of the temperature, the $Y_{H2S}$ reaches 1.75% at 480° C. which may be recycled back to a boiler. On the contrary, the yield of COS decreased with the increase of temperatures, the $Y_{COS}$ was 0.322% at 480° C. The yield of elemental sulfur ($Y_{S2}$) increased along with the increase of the temperature in the range between 340° and 480° C. The $Y_{S2}$ was more than 90% when the temperature was above 400° C. and reaches 94.4% at 480° C. The selectivity of sulfur is the largest (98.6%) at 420° C., when the conversion of $SO_2$ was 94.4% which deduced a yield of 93.0% for the sulfur.

The effect of temperatures at a condition when the molar ratio of $(H_2+CO)/SO_2$=2.2, while other experimental conditions remained unchanged was also studied. Table 6 shows that the conversion of $SO_2$ was larger than that at the molar ratio $(H_2+CO)/SO_2$=2.0 at a given temperature; C was 96.8% versus 88.8% at 380° C. The yield of elemental sulfur increased sharply with the increase of temperatures; $Y_{H2S}$ was 3.32% and 16.8% at 380° C. and 480° C. respectively. On the contrary, the yield of COS decreased with the increase of temperatures; $Y_{COS}$ was 1.49% at 380° C. and was nil at 480° C. The yield of elemental sulfur reached a maximum at 380° C., when $Y_{S2}$ was 92%. However, the supply of more than stoichiometric amount of synthesis gas represented a waste and is unattractive economically.

The effect of space velocity on the activity of Cat-S was tabulated (Table 7). The experiments were performed at a molar ratio of input feed gases $H_2/CO$=0.75 and $(H_2+CO)/SO_2$=2, and at 480° C. with 1 g of the Cat-S. The results indicated that there was little effect on the yield of elemental sulfur over the ranges from 5,000 h$^{-1}$ to 15,000 h$^{-1}$, this yield lay between 90.0 and 95.9%. The conversion of $SO_2$ and the yield of $H_2S$ exhibited slight increase with the decrease of space velocity. The yield of COS did not show any systematic changes with the change of space velocity, but it was less than 1.5% over the entire range of space velocity tested. The selectivity of elemental sulfur increases with an increase of space velocity.

The effect of the molar ratio of feed gas, $(H_2+CO)/SO_2$, on the catalyst activity was summarized in Table 8. The experiments were conducted at a fixed molar ratio $H_2/CO$= 0.75, space velocity =10,000 h$^{-1}$, and at 480° C. The conversion of $SO_2$ increased with the increase of molar ratio of $(H_2+CO)/SO_2$; a 98.1% $SO_2$ conversion was obtained at a stoichiometric ratio of 2 [Equation (1) and (2)] and a 99.7% at a molar ratio of 2.5. However, the yield of $H_2S$ increased dramatically with the increase of the molar ratio when this ratio was larger than the stoichiometric ratio; $Y_{H2S}$ was 3.81% at a molar ratio of 2, but was 30.0% at a molar ratio of 2.5. The yield of COS also showed an increase with the increase of the molar ratio, but the magnitude of this yield was small; it was 0.768% and 1.93% at a molar ratio of 2 and 2.5 respectively. Consequently, the optimum operating conditions should be at a molar ratio, $(H_2+CO)/SO_2$ of 2, when the yield of elemental sulfur reached 93.5%. The yield of elemental sulfur and the conversion of $SO_2$ decreased when the molar ratio was less than 2 (Table 8).

Synthesis gas derived from natural gas (mainly $CH_4$) contains a molar ratio of $H_2$ to CO approaching 3. Therefore, a separate set of parametric studies was carried out at a molar feed gas ratio $H_2/CO$=3. The effect of temperature, space velocity, and molar ratio of reducing gas to sulfur dioxide, $(3 H_2+CO)/SO_2$ on the conversion of $SO_2$ and the yield of products was investigated.

Tables 9 and 10 summarize the results of temperature dependence studies at a space velocity of 10,000 h$^{-1}$ and 15,000 h$^{-1}$ respectively The experiments were carried out at the feed gas ratios H$_2$/CO=3, and (3 H$_2$+CO)/SO$_2$=2. The results show that the conversion of SO$_2$ is >95% when the temperature is >380° C. at both space velocities. Over the temperature range (340° C.–480° C.) studied, the yield of H$_2$S did not show any appreciable and systematic changes: between 0.716% and 3.31% at a S.V.=10,000 h$^{-1}$ and between 0.919% and 4.96% at a S.V. 15,000 h$^{-1}$. However, the yield of COS showed a decrease with an increase of temperatures: Y$_{COS}$=2.75% and 0.749% at 340° C. and 480° C., respectively (at a S.V.=10,000 h$^{-1}$); Y$_{COS}$=10.5% and 0.178% at 340° C. and 480° C., respectively (at a S.V.=15,000 h$^{-1}$). At a S.V. =10,000 h$^{-1}$ the yield of elemental sulfur, Y$_{S2}$ is 93.7% at 380° C. and reached a maximum value of 95.1% at 420° C.; it decreased slightly to 94.4% with further increase of the temperature to 480° C. At a S.V.=15,000 h$^{-1}$ Y$_{S2}$ was 92.8% at 380° C., and reached 480° C.

The effect of space velocity on the catalyst was shown in Table 11. The conversion of SO$_2$ remains fairly stable (95.8%–98.7%) in a S.V. range of 5,000 to 15,000 h$^{-1}$. At a S.V.=15,000 h$^{-1}$, it was observed that the temperature of the catalyst increased 60 degrees C, which could be attributed to the liberation of heat from the reactions (exothermic reactions). Y$_{H2S}$ remained at very low level (0.269%–0.716%) when the S.V. was less than 10,000 h$^{-1}$, it showed a slight increase to 2.21% as the S.V. was increased to 13,570 h$^{-1}$ but it reached 4.96% as the S.V. was further increased to 15,000 h$^{-1}$. Y$_{COS}$ remained very small (0.095%–1.32%), and did not appear to have been affected systematically by the space velocity. Y$_{S2}$ remained at a very high value (95.1%–97.5%) for S.V. up to 13,750 h$^{-1}$ it decreased to 92.3% when the S.V. was increased to 15,000 h$^{-1}$.

EXAMPLE 3. Reduction by Methane

The use of natural gas (mainly methane) for the reduction of SO$_2$ can avoid a process step of producing synthesis gas from either coal or natural gas. The conversion of SO$_2$ by methane and the byproducts selectivity on the Cat-S were investigated.

Several experimental conditions were examined at a stoichiometric ratio of feed gases, (SO$_2$/CH$_4$)=2.0: two space velocities (5,000 h$^{-1}$ and 3750 h$^{-1}$) and eight temperatures (700°, 720°, 740°, 760°, 770°, 780°, 800° and 820° C.). Table 15 and 16 show the results at a S.V.=5,000 h$^{-1}$ and 3750 h$^{-1}$ respectively. The yield of both byproducts, H$_2$S and COS increased with the increase of temperatures. Y$_{COS}$ approached 2% at 820° C., while Y$_{H2S}$ increased substantially as the temperature was raised above 770° C. The optimum temperature at a S.V.=5,000 h$^{-1}$ was 770° C., where the yield of sulfur reaches 91.3%. The optimum temperature at a S.V. =3,750 h$^{-1}$ was 770°–780° C., where the yield of sulfur was 92.8%.

EXAMPLE 4. Processing of Waste Gases

Table 12, 13, and 14 show the results of the addition of 10% H$_2$S, 10% COS, and 10% H$_2$S+10% COS, respectively, to feed gases composed of $$\frac{H2}{CO} = 0.4, \frac{(H + Co = H2S + COS)}{SO_2} = 2$$

The addition of byproducts did not change the conversion of SO$_2$ and the yield of H$_2$S and COS to any appreciable amount. Despite the addition of substantial amounts of byproducts to the feed gas, the yield of sulfur remain at a level of over 92% when temperatures are above 420° C.

We claim:

1. A catalyst for the conversion of sulfur dioxide to elemental sulfur comprising, a) Iron oxide, b) Co or Nickel oxide either separately or as a mixture, c) a component selected from the group consisting of the oxides of Mo, Mn, Se, Cu, Zn, and Cr, or combination thereof, and d) a carrier, the composition of said catalyst being represented by the formula: Fe$_a$Co$_b$Ni$_c$Cr$_d$Mo$_e$Mn$_f$Se$_g$Cu$_h$Zn$_i$O$_x$ wherein:

a,b,c,d,e, and f are independently ranged between 0 and 30, g and h are between 0 and 10, i is between 0 and 5, and x is determined by the charge balance of the catalysts, and said catalyst produces a sulfur yield of at least 90% when using a H$_2$-CO mixture as the reducing agent.

2. The catalyst of claim 1, wherein the space velocity when using synthesis gas feed stock is from about 5,000 h$^{-1}$ to 15,000 h$^{-1}$.

3. The catalyst of claim 1, wherein a is in the range of 1–8.

4. The catalyst of claim 2, wherein said space velocity is from about 8,000 h$^{-1}$ to 12,000 h$^{-1}$.

5. The catalyst of claim 1, wherein the total of b and c is in the range of 1–6.

6. The catalyst of claim 4, wherein said space velocity is about 10,000 h$^{-1}$.

7. The catalyst of claim 1, wherein the total of d, e, f, g, h, and i is in the range of 0.5–2.0.

8. The catalyst of claim 1, wherein said carrier is selected from the group consisting of silica, gamma alumina, and molecular sieves.

9. The catalyst of claim 1, wherein the ratio of active catalyst to carrier is between about 0 and 0.8 by weight.

10. The catalyst of claim 1, wherein the space velocity when using methane gas feed stock is from about 1,000 h$^{-1}$ to 8,000 h$^{-1}$.

11. The catalyst of claim 1, wherein the formula is chosen from the group consisting of Fe$_4$Co$_1$Ni$_1$Mo$_1$Cr$_2$Mn$_2$O$_{18.33}$, Fe$_{2.0}$, Co$_{2.0}$Ni$_{1.0}$Mo$_{1.0}$O$_{10.0}$/Al$_2$O$_3$, and Fe$_{2.0}$Co$_{1.0}$Ni$_{2.0}$Mo$_{1.0}$O$_{9.5}$/Al$_2$O$_3$.

12. The catalyst of claim 1, wherein byproducts recycled past said catalyst result in maintenance levels of byproducts.

13. The catalyst of claim 12, wherein said byproducts are H$_2$S, COS, C, and CS$_2$.

14. The method of producing the catalyst of claim 1, comprising:

a) impregnating said carrier with a solution comprising nitrate precursors of said composition, b) heating the impregnated carrier to about 100°–150° C. for about 15 minutes to 1 hour, c) baking said carrier at about 400° C. for about 15 minutes to 1 hour, d) baking said carrier at between 600° C. and 1,000° C. for about 4 hours, and e) ceasing heating and allowing structure to equilibrate naturally to ambient temperatures with gradual cooling.

15. The method of claim 14, wherein when Mo is employed as a component of the nitrate precursors, said impregnation step a) comprises;

a) treating said carrier with an aqueous, acidic solution containing all components except Mo, b) allowing the aqueous component of said solution to evaporate and, c) treating said impregnated carrier with an aqueous, basic solution containing Mo.

16. The catalyst of claim 1, wherein the sulfur yield of said catalyst is about 92% or more.

17. The catalyst of claim 16, wherein the sulfur yield of said catalyst is about 95% or more.

18. The method of claim 14, wherein the temperature of step d) is about 820° C.

* * * * *